United States Patent
Kido

(10) Patent No.: US 9,578,199 B2
(45) Date of Patent: Feb. 21, 2017

(54) CONTROL OF DRIVING ELEMENT

(71) Applicant: CANON KABUSHIKI KAISHA, Tokyo (JP)

(72) Inventor: Hideyuki Kido, Isehara (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/816,590

(22) Filed: Aug. 3, 2015

(65) Prior Publication Data

US 2016/0057306 A1 Feb. 25, 2016

(30) Foreign Application Priority Data

Aug. 25, 2014 (JP) .................................. 2014-170893

(51) Int. Cl.
*G03G 21/20* (2006.01)
*H04N 1/00* (2006.01)
*H04N 1/32* (2006.01)

(52) U.S. Cl.
CPC ...... *H04N 1/00978* (2013.01); *H04N 1/00925* (2013.01); *H04N 1/00933* (2013.01); *H04N 1/32037* (2013.01); *H04N 2201/0094* (2013.01)

(58) Field of Classification Search
CPC ............ H04N 1/00978; H04N 1/00925; H04N 2201/0094; B41J 29/38
USPC .............................. 358/1.13, 504; 399/44, 94
See application file for complete search history.

(56) References Cited

U.S. PATENT DOCUMENTS

| 2003/0142346 A1* | 7/2003 | Shirotori | B41J 29/38 358/1.15 |
| 2009/0160884 A1* | 6/2009 | Nakata | B41J 23/00 347/5 |
| 2013/0194341 A1* | 8/2013 | Ishizuka | B41J 11/0095 347/17 |

FOREIGN PATENT DOCUMENTS

JP 2003-023514 A 1/2003

* cited by examiner

*Primary Examiner* — Jamares Q Washington
(74) *Attorney, Agent, or Firm* — Fitzpatrick, Cella, Harper & Scinto

(57) ABSTRACT

An apparatus according to the present invention includes a reception unit which receives selection of a function from a plurality of types of functions, an execution unit which executes the function received by the reception unit, a determination unit which determines whether temperature rise suppression of a predetermined driving element is necessary, and a stop control unit which performs stop control on the predetermined driving element in accordance with the type of the selected function, if the determination unit determines that temperature rise suppression is necessary.

19 Claims, 15 Drawing Sheets

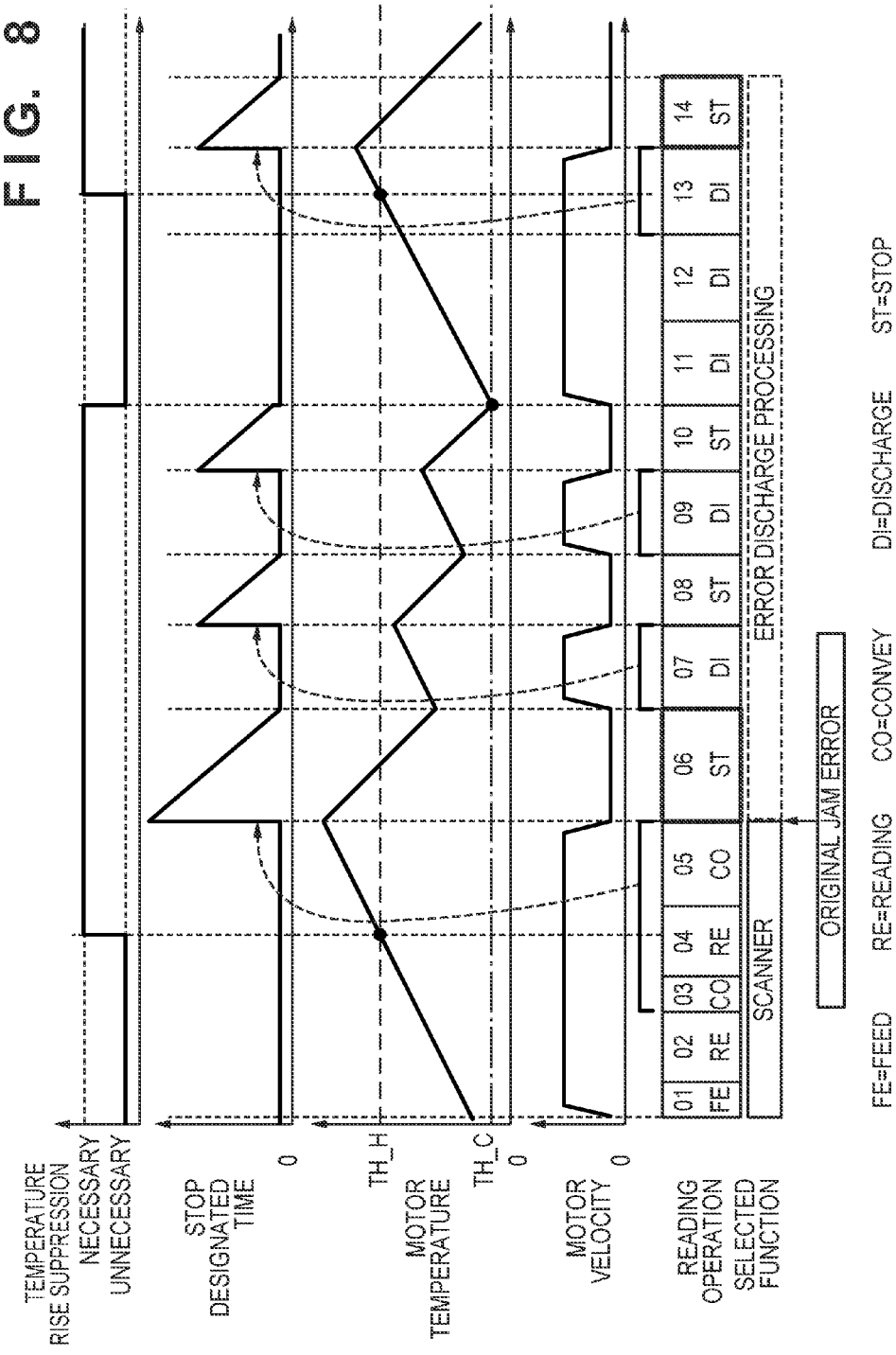

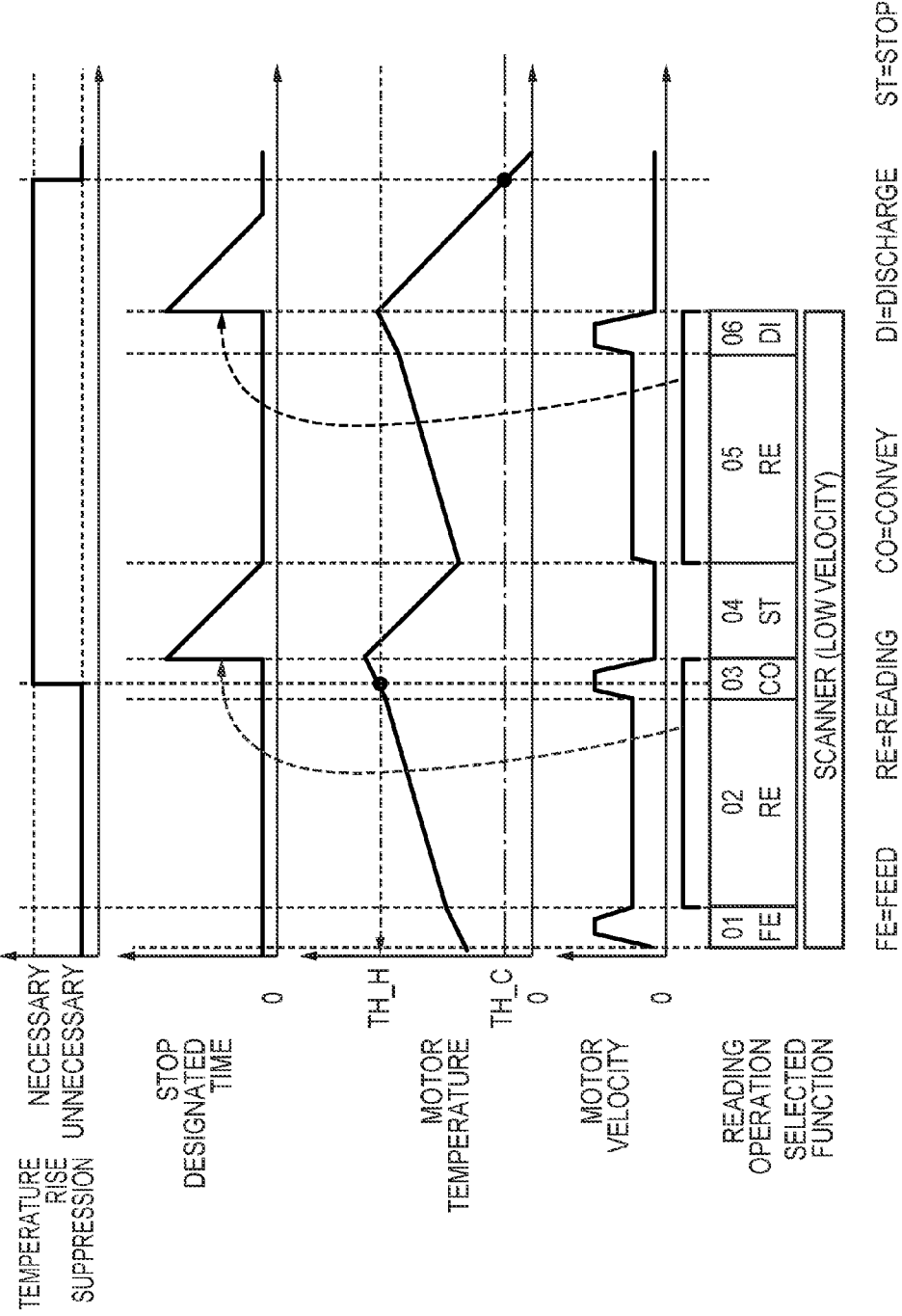

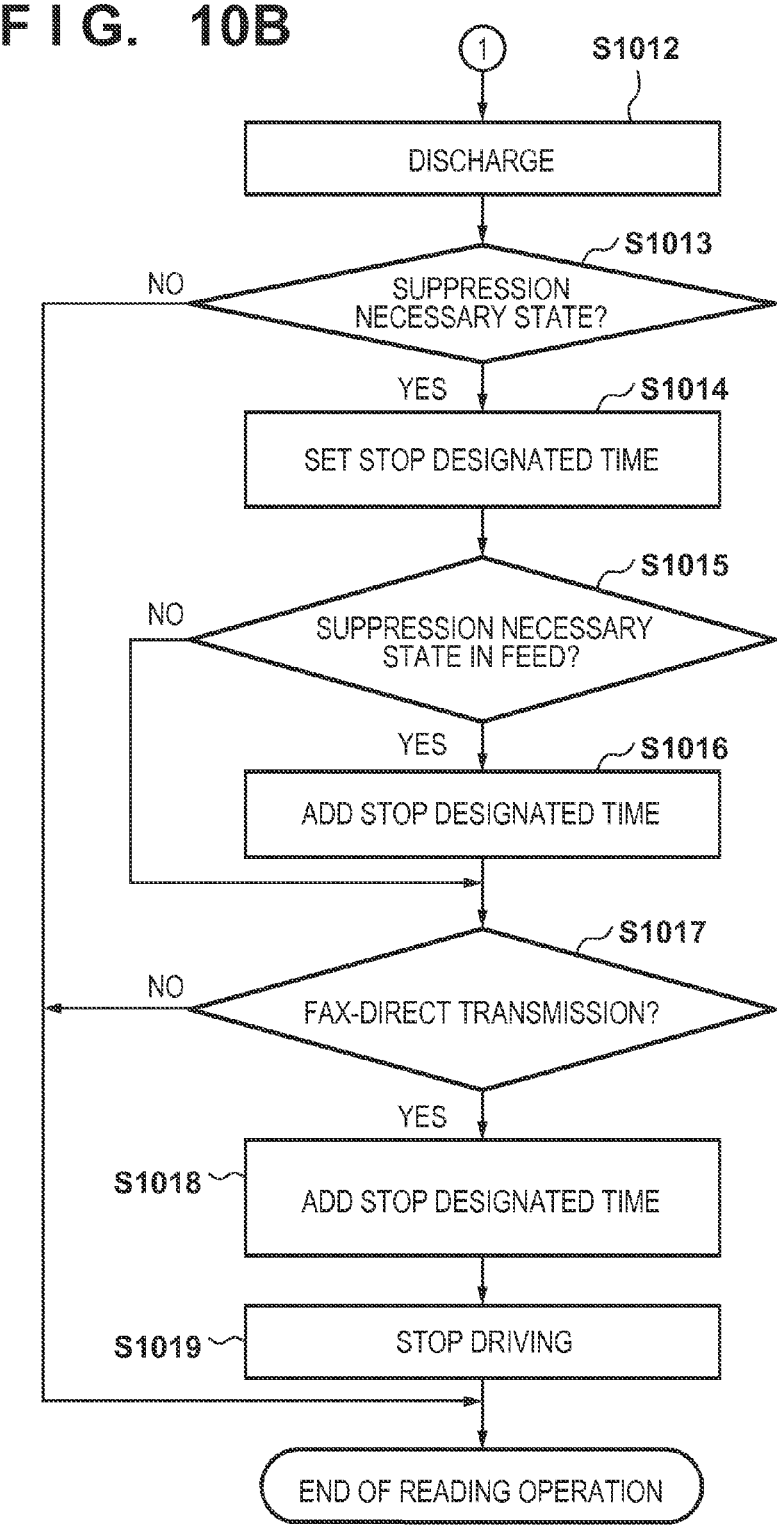

CONTROL OF DRIVING ELEMENT

BACKGROUND OF THE INVENTION

Field of the Invention

The present invention relates to a temperature control technique for a driving element.

Description of the Related Art

An original reading apparatus including an original reading function sometimes requires temperature management for a driving element which generates heat when driven. For example, in an image reading apparatus including an automatic original feeder, a motor as a driving source of a conveying mechanism for conveying an original generates heat when driven. To increase the original reading speed, a larger electric current must be supplied to the motor. However, the amount of generated heat increases as the electric current to be supplied to the motor increases. Also, when reading a large amount of originals in succession, the motor is continuously driven for a long time, so the amount of generated heat increases. Accordingly, motor temperature management is necessary.

Japanese Patent Laid-Open No. 2003-23514 has disclosed a technique of controlling the temperature of a motor of an image reading apparatus. In Japanese Patent Laid-Open No. 2003-23514, when the temperature of the motor is high, a temperature rise of the motor is suppressed by performing control which stops the motor.

In an original reading apparatus such as a multi function peripheral, processing for reading data of an original is executed in accordance with a function selected by the user. Examples of functions selectable by the user are a scanner function, copy function, and fax function. When performing the control which stops the motor in order to suppress a temperature rise of the motor, it is sometimes impossible to smoothly perform the selected function. For example, when a function such as fax transmission by which the start timing of image data transmission is restricted by the communication standards is selected, the communication standards cannot be kept in some cases if reading of an original is not started because the motor is stopped.

SUMMARY OF THE INVENTION

The present invention provides a technique of suppressing a temperature rise of a driving element while smoothly executing a selected function.

According to an aspect of the present invention, there is provided an apparatus comprising a reception unit configured to receive selection of a function from a plurality of types of functions, an execution unit configured to execute the function received by the reception unit, a determination unit configured to determine whether temperature rise suppression of a predetermined driving element is necessary, and a stop control unit configured to perform stop control on the predetermined driving element in accordance with the type of the selected function, if the determination unit determines that temperature rise suppression is necessary.

Further features of the present invention will become apparent from the following description of exemplary embodiments (with reference to the attached drawings).

BRIEF DESCRIPTION OF THE DRAWINGS

FIG. 8 is a view for explaining temperature management;

FIG. 9 is a view for explaining temperature management;

FIGS. 10A and 10B are flowcharts showing an example of a reading process using the automatic original feeder;

DESCRIPTION OF THE EMBODIMENTS

Embodiments of the present invention will be explained below with reference to the accompanying drawings. Note that the following embodiments do not limit the present invention, and not all components to be explained in the following embodiments are indispensable.

<Apparatus Arrangement>

Figure 1:
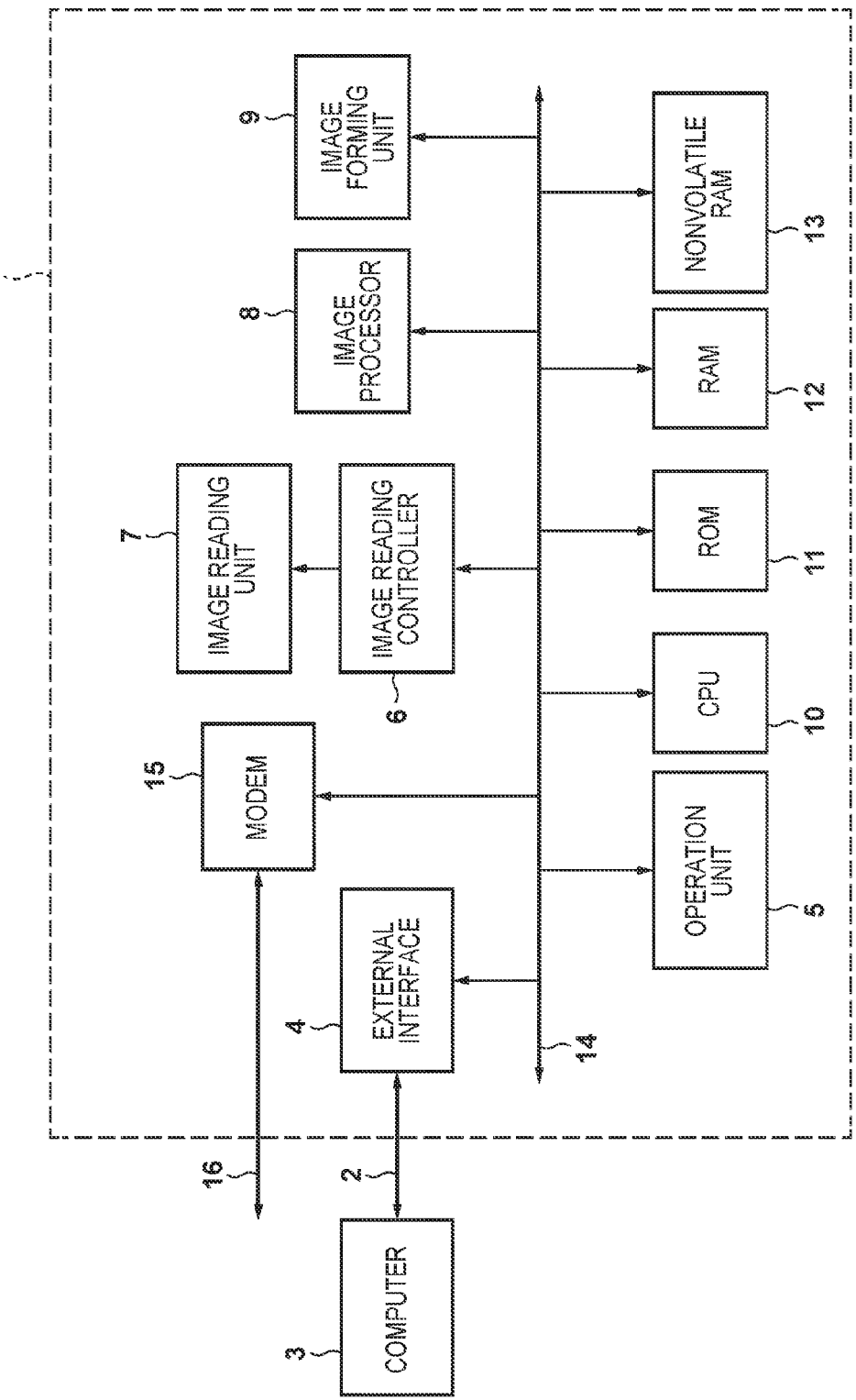
FIG. 1 is a block diagram of an apparatus according to an embodiment.

FIG. 1 is a block diagram of an apparatus 1 according to an embodiment of the present invention. The apparatus 1 is an original reading apparatus, and is particularly a so-called multi function peripheral in this embodiment. The apparatus 1 will sometimes be called a multi function peripheral 1 hereinafter.

The multi function peripheral 1 has a plurality of functions, particularly, a plurality of functions of processing read data of an original. It is assumed that an original is a paper original in this embodiment, but it may also be an original other than paper. Read data of an original will sometimes be called image data.

The plurality of functions are roughly classified into a scanner function, copy function, and fax-transmission function. The fax-transmission function includes a fax-memory-transmission function and fax-direct-transmission function. Examples of other functions of the multi function peripheral 1 are a printer function and error discharge function.

The scanner function is a function which uses the multi function peripheral 1 as a scanner, and sends read data of an original to a computer 3 connected to the multi function peripheral 1. The copy function is a function of copying a read image of an original to a recording medium such as paper. The fax-memory-transmission function is a function by which after recording of read data of an original to a memory is started, a line is connected by calling a transmission destination, and the read data is transmitted to the transmission destination. The fax-direct-transmission function is a function by which a line is connected by calling a transmission destination before reading of an original is started, and, after fax transmission is enabled, original reading is started by a reading start operation by an operator, and the read data is transmitted.

The printer function is a function by which the multi function peripheral 1 is used as a printer, and an image based on image data received from the computer 3 connected to the multi function peripheral 1 is printed on a printing medium such as paper. The error discharge function is a function by which if a conveyance error occurs in the multi function peripheral 1 or an operator performs a canceling operation, an original remaining in an original stacker is discharged.

The multi function peripheral 1 is connected to the computer 3 from an external interface 4 via an external bus 2. In this embodiment, the external bus 2 is formed by a USB (Universal Serial Bus). However, it is also possible to use a network connection capable of connecting to a plurality of external apparatuses, or another interface.

A CPU 10 is a processor for controlling the multi function peripheral 1 by executing programs. A ROM 11 stores the programs which operate on the CPU 10 and fixed data. A RAM 12 is a programmable work memory for holding stored data which volatilizes when the power supply is turned off. On the other hand, a nonvolatile RAM 13 is a programmable memory which permanently stores data, that is, in which stored data does not volatilize even when the power supply is turned off. Note that it is also possible to adopt other storage devices instead of the ROM 11 and RAMs 12 and 13.

An operation unit 5 is an input device by which an operator inputs instructions to the multi function peripheral 1. In this embodiment, the operation unit 5 includes a touch panel. When the operator performs a selecting operation on the touch panel, it is possible to receive the selection of a function of processing read data of an original from the above-described scanner function, copy function, fax-memory-transmission function, and fax-direct-transmission function.

In the multi function peripheral 1, an image reading unit 7 is a reading unit for reading an original. This reading unit includes a light source for irradiating an original with light, and an image sensor in which elements for reading the reflected light and photoelectrically converting the read light are arranged.

An image reading controller 6 is a circuit which performs A/D (Analog/Digital) conversion on an analog electrical signal to be read by the image reading unit 7, corrects the characteristics of the image reading unit 7, and performs DMA (Direct Memory Access) transfer in order to store digital image data in the RAM 12.

An image processor 8 is a circuit which reads out image data stored in the RAM 12, and performs various kinds of image processing for improving the image quality, and an image conversion process for image formation. Also, the image processor 8 includes a circuit which reads out image data stored in the RAM 12 and encodes the readout data by using the JPEG method, and a circuit for decoding encoded data.

When reading a both-side original, the image processor 8 encodes, by using the JPEG method, image data stored in the RAM 12 by the image reading controller 6, and the encoded data is stored in the RAM 12 again. This encoding process by the image processor 8 operates in parallel with the process of storing image data in the RAM 12 by the image reading controller 6. Also, the area of the RAM 12 in which the encoded image data is stored is released and used to record image data by the image reading controller 6 again. By thus sequentially encoding read image data, many images can be stored on the RAM 12 compared to a case in which image data is not encoded. This makes a reading operation possible even when the storage area usable for reading is limited. In addition, when sending image data to the external computer 3, the communication data amount is smaller than that when image data is not encoded, so the image data is sent at a high speed.

An image forming unit 9 is a device which forms an image on a recording medium by an electrophotographic method using a photosensitive drum as a rotatable image carrier for forming an electrostatic latent image.

When the scanner function is selected, the image reading unit 7 reads an original. The image reading controller 6 performs A/D conversion and characteristic correction on an analog signal output from the image reading unit 7, and stores image data of a digital signal in the RAM 12. The image processor 8 encodes the image data written in the RAM 12 by JPEG, and stores the encoded data in the RAM 12. Then, the encoded data is sent to the computer 3 from the external interface 4 via the external bus 2.

When the copy function is selected, the process is the same as that of the scanner function until the encoded data is stored in the RAM 12. After that, the image processor 8 decodes the encoded data and performs various kinds of image processing on the image data, and the image forming unit 9 forms an image on a recording medium.

When the fax-transmission function is selected, the process is the same as that of the scanner function until the image data is stored in the RAM 12. Then, the image processor 8 encodes the image data in the RAM 12 by using the JPEG method or the like, and writes the image data as code data in the RAM 12 again. Subsequently, the code data read out from the RAM 12 by the CPU 10 is written in and modulated by a modem 15, and the modem 15 transmits the modulated data to another facsimile apparatus through a public line 16 based on a communication function defined by the ITU-T recommendation.

Figure 2:
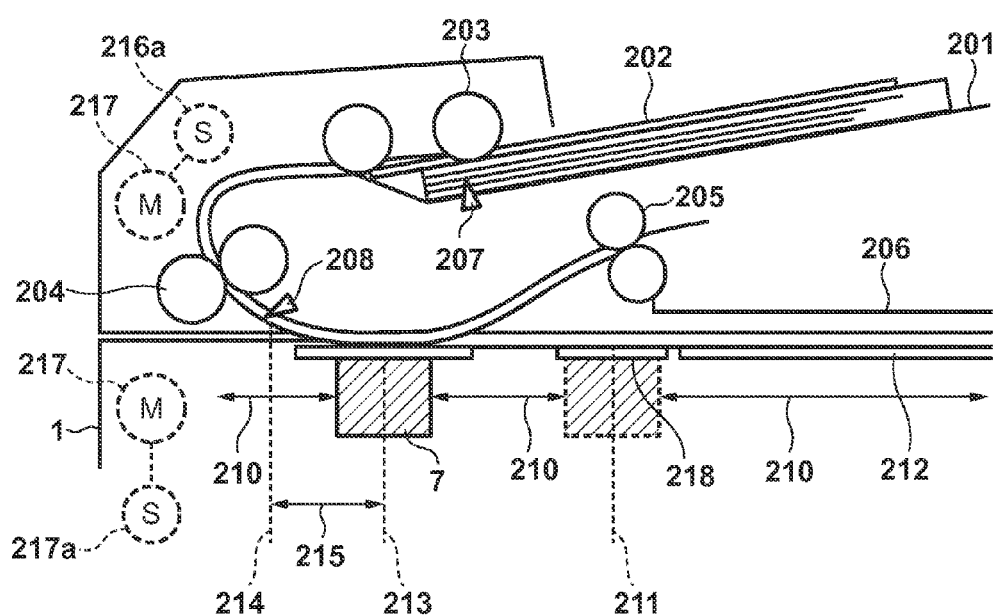
FIG. 2 is a view for explaining the operation of an automatic original feeder.

Next, an automatic original feeder of the multi function peripheral 1 will be explained with reference to FIG. 2. The automatic original feeder is a conveying mechanism for conveying an original. FIG. 2 is a schematic sectional view in which an original conveyance path of the automatic original feeder is viewed sideways.

In the automatic original feeder, an original stacker 201 is a stacking tray for stacking originals. When performing a reading operation by using the automatic original feeder, a feeding roller 203 first feeds an uppermost original 202 in the original stacker 201 into the automatic original feeder.

A conveyance roller 204 as a conveying unit conveys the fed original 202 along a conveyance path, and the reading operation is started when the leading edge of the original has reached a reading position 213. After the reading operation is started, reading is continued while the original 202 is conveyed, and the reading operation is terminated after the trailing edge of the original is read or a predetermined amount is read. The read original 202 is discharged to an original discharge unit 206 by a discharge roller 205. In this embodiment, the operation of starting reading from the leading edge of an original and terminating the reading at the trailing edge of the original is explained. However, it is also possible to start reading from a position located before the leading edge of an original by a predetermined amount. Furthermore, it is also possible to terminate reading at a position located after the trailing edge of an original by a predetermined amount.

The image reading unit 7 is movable in the direction of an arrow 210 in FIG. 2, that is, in the conveyance direction of paper, and positioned in a standby position 211 except during a reading operation. When performing a reading operation using the automatic original feeder, the image reading unit 7 is stopped in the reading position 213, and an original conveyed along the conveyance path is read.

An original sensor 207 is a sensor for sensing the presence/absence of an original in the original stacker 201. An original leading edge sensor 208 is a sensor for sensing the leading edge position of an original conveyed by the conveyance roller 204. When the leading edge of the original 202 conveyed by the conveyance roller 204 has reached the original leading edge sensor 208, the value of the sensor changes, and this makes it possible to sense that the leading edge of the original 202 is in the position of the original leading edge sensor 208. Also, the sensor value changes when the trailing edge of the original 202 has passed through the original leading edge sensor 208. Accordingly, the original leading edge sensor 208 can sense that the trailing edge of the original 202 is in the position of the original leading edge sensor 208. A reading operation is started and terminated based on the sensed leading edge position and trailing edge position of the original.

Reading of the original 202 is started after the original is conveyed by a preset reading start conveyance amount since the timing at which the original leading edge sensor 208 has sensed the leading edge position of the original. Also, reading of the original 202 is terminated after a predetermined reading termination conveyance amount is read since the timing at which the original leading edge sensor 208 has sensed the trailing edge position of the original.

A calibration sheet 218 is a sheet for obtaining a white reference for correcting the characteristics of the image reading unit 7. In addition, a pattern for determining the reference position of the image reading unit 7 in motion is formed on the calibration sheet 218, so the calibration sheet 218 is also used to detect the position of the image reading unit 7. The position of the image reading unit 7 is detected by reading the calibration pattern 218 and its vicinity while the image reading unit 7 is moved, and detecting the pattern from the read image. It is possible to accurately hold the standby position 211 of the image reading unit 7 by setting the standby position 211 as a relative position having a predetermined amount from the detected position. This position detection of the image reading unit 7 is always performed when the power supply is turned on and before the image reading unit 7 moves to the standby position 211 after a reading operation is terminated.

Note that position detection of the image reading unit 7 is performed using the calibration sheet 218 in this explanation, but another position detection method may also be adopted. For example, it is also possible to detect the position of the image reading unit 7 by using a sensor for sensing the position. Furthermore, it is possible to detect the position by moving the image reading unit 7 as much as possible and abutting it against a movable range end portion.

The image reading unit 7 is used to perform not only a reading operation using the automatic original feeder but also a reading operation for a fixed original. When performing the reading operation for a fixed original, the image reading unit 7 is moved in the direction of a fixed original reading surface 212, and reading of an original placed on the fixed original reading surface 212 is started.

A motor 216 is a driving motor for driving the feeding roller 203, conveyance roller 204, and discharge roller 205, and is a driving source of the automatic original feeder. Rollers to be driven can be switched by a driving force transmission mechanism (not shown). A rotary encoder 216a for detecting the driving amount (rotation amount) of the motor 216 is attached to it.

A motor 217 is a driving motor for moving the image reading unit 7. A rotary encoder 217a for detecting the driving amount (rotation amount) is attached to the motor 217. This embodiment adopts the arrangement in which the rotary encoder is attached to detect the driving amount of the motor, but another sensor may also be used. It is also possible to adopt a method of detecting the rotation amount of a component such as a roller which is driven by the motor.

<Temperature Management>

Figure 3:
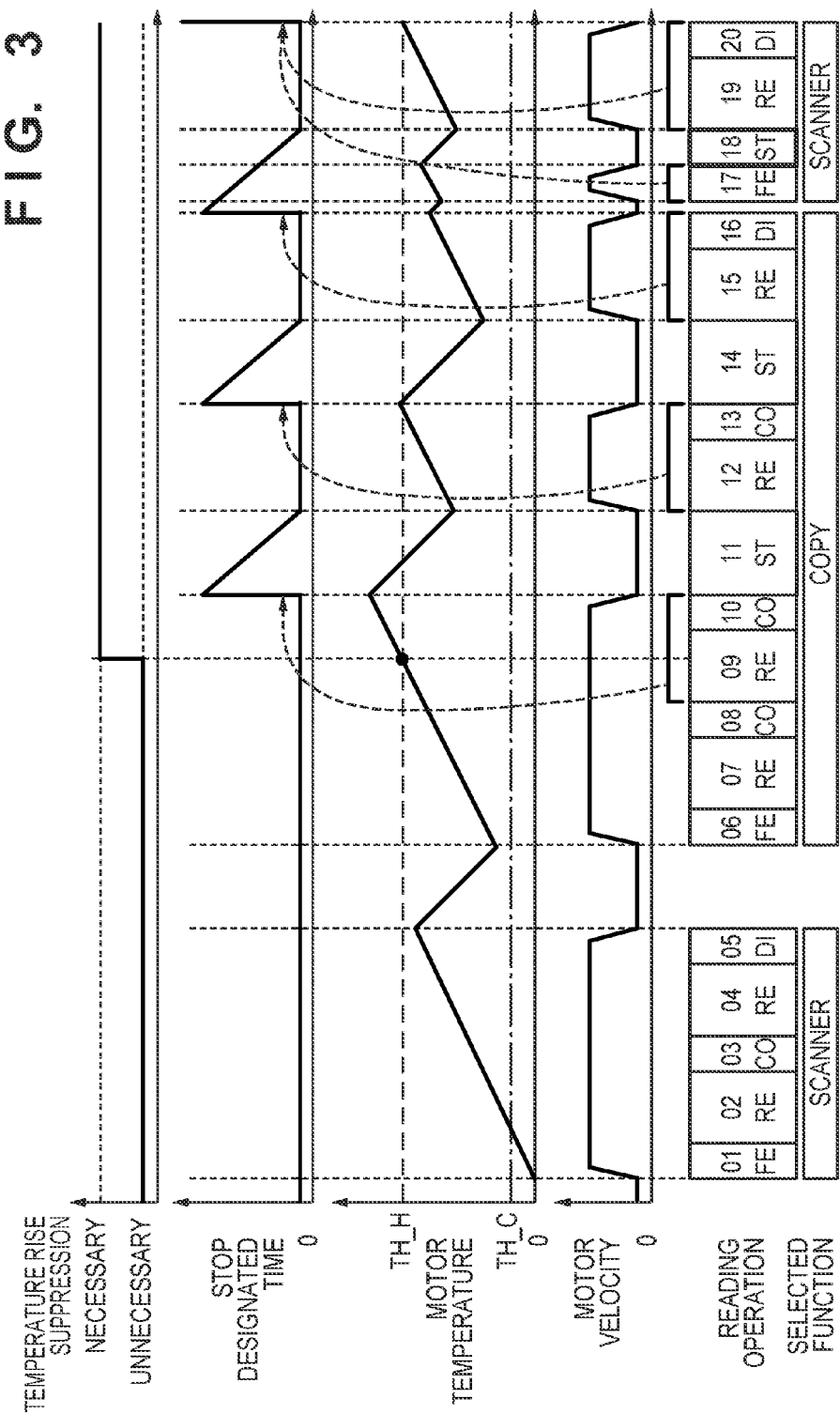
FIG. 3 is a view for explaining temperature management.

Since the motor 216 generates heat when driven, motor temperature management is performed. FIG. 3 is a view (timing chart) for explaining stop control of the motor 216 in order to suppress a temperature rise. In FIG. 3, the abscissa indicates the elapse of time. Each item will be explained from above.

The "temperature rise suppression" indicates the result of determination of whether suppression of a temperature rise of the motor 216 is necessary. If the result is "necessary", a temperature management process including driving stop for suppressing a temperature rise of the motor 216 and setting of a stop time is performed. Note that the driving stop for suppressing a temperature rise will sometimes be called temperature rise stop hereinafter, the temperature rise stop time will sometimes be called a stop designated time hereinafter, and the case in which temperature rise suppression is necessary will sometimes be called a suppression necessary state hereinafter. On the other hand, if the result is "unnecessary", no such temperature management process is performed. The case in which the process is "unnecessary" will sometimes be called a suppression unnecessary state hereinafter.

The "stop designated time" indicates the remaining time (on the ordinate) of the stop designated time set for temperature rise stop. The stop designated time is set at an initial value and reduced with the elapse of time. A temperature rise of the motor 216 is stopped as long as the stop designated time is longer than 0.

The "motor temperature" indicates the motor temperature (on the ordinate). If the motor temperature is equal to or higher than a threshold value TH_H, temperature rise suppression is set to necessary. After temperature rise suppression is set to necessary, temperature rise suppression is set to unnecessary if the motor temperature is equal to or lower than a threshold value TH_C.

That is, the threshold value TH_H is a threshold value for determining temperature rise suppression of the motor 216. Even after temperature rise suppression is set to necessary, driving of the motor 216 sometimes continues, and the motor temperature becomes higher than the threshold value TH_H in some cases. For example, in this embodiment as will be described later, a maximum driving amount of the motor 216 after temperature rise suppression of the motor 216 is set to necessary is a case in which one original having a maximum length readable without any temperature rise stop is read in fax-direct transmission.

Accordingly, the threshold value TH_H is determined by taking account of a further rise of the motor temperature. In this embodiment, when it is necessary to keep the motor temperature equal to or lower than a predetermined upper-limiting temperature, threshold value TH_H=upper-limiting temperature−temperature with maximum driving amount holds.

Note that the method of determining the threshold value TH_H is not limited to this. If no problem arises even when there is a time during which the upper-limiting temperature is exceeded, the threshold value TH_H can be determined without taking the maximum driving amount into consideration. Alternatively, the threshold value TH_H may be decided in consideration of an ambient temperature at which the multi function peripheral 1 is used. It is also possible to determine the necessity of temperature rise suppression of the motor 216 based on not the motor temperature but the temperature of another driving element (an image sensor unit or light source unit) which raises the temperature due to a reading operation.

In this embodiment, an estimated value obtained by a temperature estimating process is used as the motor temperature. The method of temperature estimation is a method of simply approximating an integrated value of a motor driving current. More specifically, a coefficient corresponding to an estimated value of the motor temperature and the driving velocity at a given timing is added to the estimated value of the motor temperature at a predetermined time interval.

As an example, a case in which the motor temperature estimated value is 40.0° C. and the predetermined time interval is 1 sec will be explained. Assume that the motor is driven at a driving velocity of 10,000 [slits/sec] for 1 sec, and a coefficient corresponding to 40° C. and a driving velocity of 10,000 [slits/sec] is 0.2. When the motor is driven for 1 sec, the estimated value of the motor temperature is updated to 40.2° C. Note that the motor velocity is the value of a rotation amount [slits/sec] per unit time of the rotary encoder 216a.

A case in which the motor is stopped for next 1 sec will be explained. Assume that a coefficient corresponding to 40.2° C. and a driving velocity of 0 [slits/sec] is −0.1. In this case, the estimated value of the motor temperature is updated to 40.1° C. The motor temperature can be estimated by repeating processing like this at a predetermined time interval.

Note that the motor temperature may also actually be measured. That is, it is also possible to use a temperature sensor for measuring the motor temperature, and use the measured value of the temperature sensor as the motor temperature.

The "reading operation" indicates an operation pertaining to reading of an original, and represents the conveying operation by the automatic original feeder and the operation of the image reading unit 7 in a time-series order. The operation pertaining to reading of an original is divided into stages of "feed" (FE), "reading" (RE), "convey" (CO), and "discharge" (DI).

The "feed" is a feed operation of conveying an original stacked in the original stacker 201 to the reading start position. The "reading" includes an operation of conveying an original from the reading start position to the reading end position, and an operation of reading the conveyed original (moving image reading).

The "convey" includes a discharge operation of conveying the read original to the original discharge unit 206, and a feed operation of conveying the next original to the reading start position. When reading one original, therefore, there is no "convey". The "discharge" is a discharge operation of conveying the read original to the original discharge unit 206 when there is no next original.

From the foregoing, the "reading operation" includes feed, reading, and discharge when there is one original, and includes feed, reading, convey, and discharge when a plurality of originals exist.

The "stop" (ST) indicates that temperature rise stop is under execution. That is, motor driving is stopped. In other words, the operation pertaining to reading of an original is stopped.

The "selection function" indicates the type of function selected by the operator and received by the CPU 10 when reading an original. For example, a reading operation from "01 FE" to "05 DI" is a reading operation executed when the scanner function is selected. Also, a reading operation from feed 6 to discharge 16 is a reading operation executed when the copy function is selected.

The state shown in FIG. 3 will now be explained. "01 FE" to "05 DI" shown in FIG. 3 indicate an operation of reading two originals by using the automatic original feeder when the scanner function is selected.

A series of operations will be explained. First, an original is fed in "01 FE", and the first fed original is read in "02 RE". The read original is discharged and the next original is fed in "03 CO", and the second original is read in "04 RE". When "04 RE" is complete, there is no next original, so "05 DI" is performed, and the reading operation is terminated.

Since the motor 216 continuously operates from "01 FE" to "05 DI", the motor temperature rises accordingly. In this operation, the motor temperature does not reach TH_H, so a state from "01 FE" to "05 DI" is the suppression unnecessary state.

"06 FE" 6 to "16 DI" shown in FIG. 3 indicate an operation of reading four originals by using the automatic original feeder when the copy function is selected. Note that an operation of printing a read image on a printing medium is executed in addition to the reading operation, but this operation is omitted from FIG. 3.

A state from the end of "05 DI" of the preceding operation to the start of "06 FE" is an idling state in which the operator performs nothing. In this idling state, the motor 216 is stopped, so the motor temperature lowers with the elapse of time. When the reading operation is executed in this copy function, however, the motor temperature rises again, and the suppression unnecessary state changes to the suppression necessary state during reading of the second original.

A series of operations of the copy function will be explained. First, an original is fed in "06 FE", and the first fed original is read in "07 RE". When "07 RE" is complete, the original is discharged and the next original is fed in "08 CO", and the second original is read in "09 RE". Since the motor temperature becomes equal to or higher than TH_H during "09 RE", temperature rise suppression is necessary, so the suppression necessary state begins. When "09 RE" is complete, the original is discharged and the next original is fed in "10 CO". When "10 CO" is complete, a stop designated time is set because the current state is the suppression necessary state.

In this embodiment, the stop designated time is set based on the driving status of the motor 216 for each original. In this operation, the stop designated time is set based on the driving status of the motor 216 in "09 RE" and "10 CO". As an example, the stop designated time is set in accordance with the driving amount and driving velocity of the motor 216.

A stop designated time [sec] corresponding to "09 RE" is determined by obtaining a stop time coefficient [seconds/slit] from a reading driving velocity [slits/sec], and multiplying a reading driving amount [slits] by the obtained stop time coefficient. As the stop time coefficient [seconds/slit], it is possible to predetermine stop time coefficients corresponding to a plurality of driving velocity ranges, and use a stop time coefficient within a range corresponding to the reading driving velocity.

Also, a stop designated time [sec] corresponding to "10 CO" is similarly determined by obtaining a stop time coefficient [seconds/slit] from a conveyance driving velocity [slits/sec], and multiplying a conveyance driving amount [slits] by the obtained stop time coefficient. That is, a stop designated time [sec] when "10 CO" is complete is ((stop time coefficient corresponding to reading driving velocity× reading driving amount)+(stop time coefficient corresponding to conveyance driving velocity×conveyance driving amount)).

In this explanation, "slit" indicates the number of times the slit of the rotary encoder 216a is detected during driving. The stop designated time is obtained from the driving velocity and driving amount in this explanation, but the present invention is not limited to this. The stop designated time may also be calculated in accordance with the reading velocity or conveyance velocity, and may also be a predetermined fixed value. Furthermore, the stop designated time may also be determined in accordance with the temperature of a temperature management target.

Then, "11 ST" is performed. During stop, the set stop designated time is set as an initial value and reduced with the elapse of time. The end of temperature rise stop is determined in accordance with whether the stop designated time is 0. During stop, the motor 216 is stopped, so the motor temperature lowers with the elapse of time.

When "11 ST" is complete, "12 RE" of the third original is performed. When "12 RE" is complete, the original is discharged and the next original is fed in "13 CO". When "13 CO" is complete, the stop designated time is set and "14 ST" is performed in the same manner as in stop of the last original, because the suppression necessary state is set.

As described above, "stop" is performed whenever "reading" and "convey" are performed in the suppression necessary state. This suppresses a temperature rise of the motor 216 caused by "reading" and "convey". The motor temperature can be made equal to or lower than a predetermined temperature by making the temperature drop during stop larger than the temperature rise by "reading" and "convey".

When "14 ST" is complete, "15 RE" of the fourth original is performed. When "15 RE" is complete, "16 DI" is performed because there is no next original. When "16 DI" is complete, the stop designated time is set because the current state is the suppression necessary state. As the stop designated time, a stop designated time corresponding to the driving amount and driving velocity of the motor 216 in "15 RE" and "16 DI" is set. After the stop designated time is set, the reading operation is terminated.

In this reading operation termination, no forced driving stop is performed unlike in "14 ST", but the reading operation of the copy function is terminated in processing, and the next function selection is made receivable. Since the next function selection is receivable, the operability for the operator improves. The stop designated time reduces because the motor 216 is stopped. In this embodiment, no forced driving stop is performed as "stop" when the reading operation is terminated, in processes except when the fax-direct-transmission function (to be described later) is selected and except for the error discharge processing.

"17 FE" to "20 DI" indicate an operation of reading one original by using the automatic original feeder when the scanner function is selected. In this operation, the suppression necessary state is set from "17 FE" to "20 DI".

A series of operations will be explained. First, an original is fed in "17 FE". Since the stop designated time set when the copy function is selected last time remains, the stop designated time is reduced in "17 FE" as well. A temperature rise of the motor 216 caused by "17 FE" will be suppressed later (by the setting of the stop designated time for this original), and the stop designated time set for the last original is reduced.

When "17 FE" is complete, the stop designated time set for the last original still remains. Therefore, "18 ST" is performed. Temperature rise suppression by "18 ST" is temperature rise suppression corresponding to the last original conveyance ("15 RE" and "16 DI"). When the scanner function is selected immediately after the reading operation by the copy function is terminated, the operator may misunderstand that function selection is normally received if stop after "16 DI" is continued and no feed is started. In this embodiment, "18 ST" is performed after "17 FE", so the operator can easily recognize that a function having undergone a start operation by the operator is received.

When "18 ST" is complete, "19 RE" for the first fed original is performed. When "19 RE" is complete, there is no next original, so "20 DI" is performed. When "20 DI" is complete, the stop designated time is set because the current state is the suppression necessary state. Since "17 FE" is the operation in the suppression necessary state, a stop designated time corresponding to the driving amount and driving velocity of the motor 216 in "17 FE", "19 RE", and "20 DI" is set.

In this embodiment, when an original is fed in the suppression necessary state, a stop designated time corresponding to the feed operation is set in the stop designated time setting after discharge. However, the present invention is not limited to this. For example, in addition to the stop designated time after feed, it is also possible to suppress a motor temperature rise in feed by temperature rise stop after feed. Also, when reading a plurality of originals, a motor temperature rise may be suppressed in addition to the stop designated time of temperature rise stop after "convey".

Note that in this embodiment, while the image reading unit 7 is reading an original, a temperature rise of the motor 216 is not stopped even when it is determined that temperature rise suppression of the motor 216 is necessary. This is so because if temperature rise stop is performed during reading of an original, the reading position of the original readily shifts before and after the stop, and an image sometimes becomes discontinuous or longer. Also, when performing deceleration and acceleration in order to stop and resume driving of the motor 216 during temperature rise stop, a relatively large electric current must be supplied to the motor 216 compared to that when holding a constant velocity such as during reading. Therefore, as an interval at which temperature rise stop is performed shortens, a temperature rise caused by the electric current to be supplied for acceleration and deceleration increases. Accordingly, the cooling efficiency increases when the number of times of temperature rise stop is decreased and the stop time is increased. In this embodiment, a temperature rise of the motor 216 is stopped before starting reading of one original. However, control is also performed such that temperature rise stop is performed before starting reading of a plurality of originals.

Figure 4:
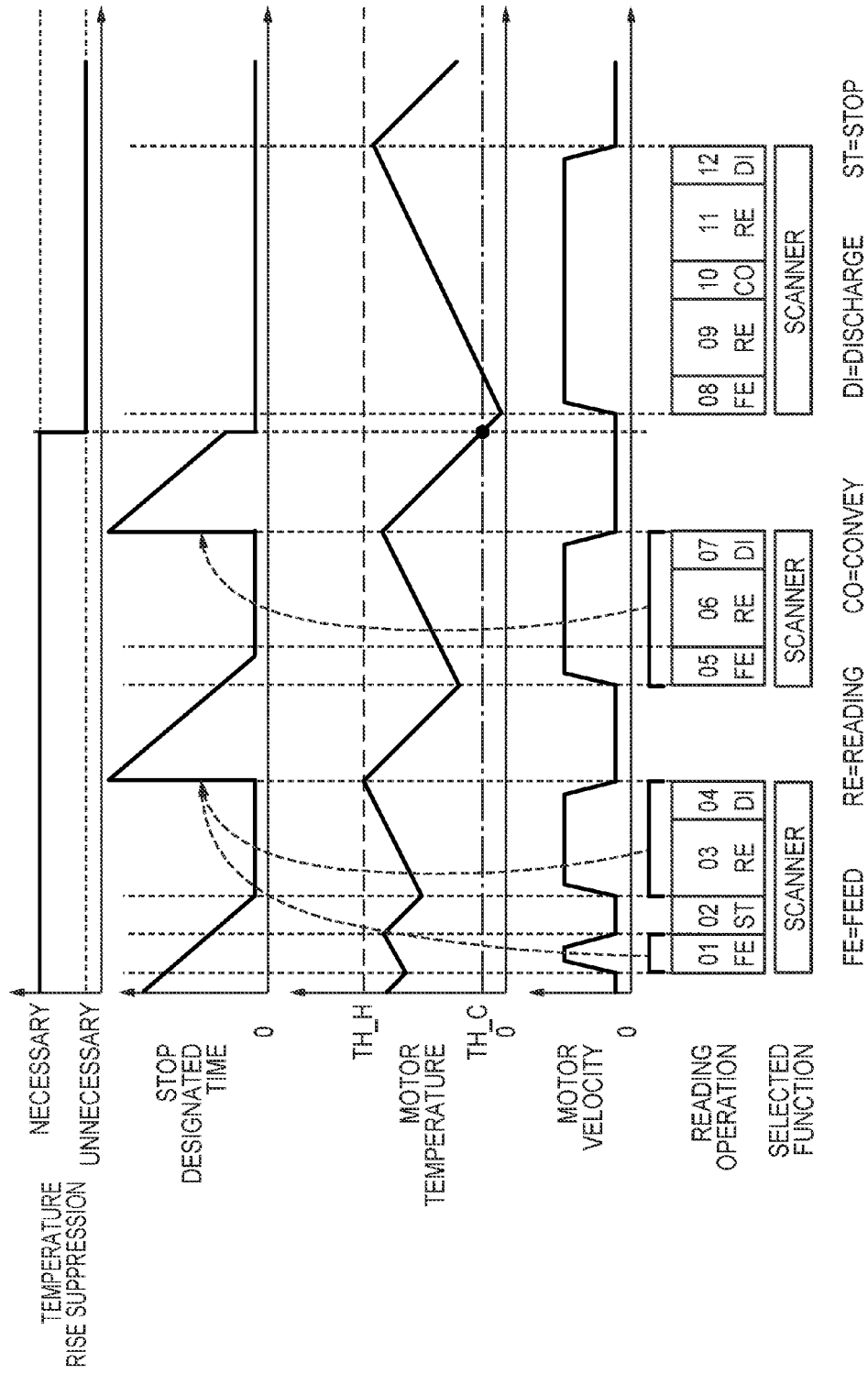
FIG. 4 is a view for explaining temperature management.

FIG. 4 shows an example in which no temperature rise stop is performed before "reading" when the stop designated time is 0 before "reading".

"01 FE" to "04 DI" shown in FIG. 4 indicate an operation of reading one original by using the automatic original feeder when the scanner function is selected, and are the same as "17 FE" to "20 DI" shown in FIG. 3.

"05 FE" to "07 DI" shown in FIG. 4 indicate an operation of reading one original by using the automatic original feeder when the scanner function is selected. In this operation, the suppression necessary state is set from "05 FE" to "07 DI". The operation differs from that of "01 FE" to "04 DI" in that the stop designated time is 0 when "05 FE" is complete and no temperature rise stop is performed.

A series of operations will now be explained. First an original is fed in "05 FE". When this feed is complete, no stop designated time remains, so no stop operation is performed. When "05 FE" is complete, "06 RE" for the first fed original is performed. When "06 RE" is complete, "07 DI" is performed because there is no next original.

When "07 DI" is complete, the stop designated time is set because the current state is the suppression necessary state. Since "05 FE" is the operation in the suppression necessary state, a stop designated time corresponding to the driving amount and driving velocity of the motor 216 in "05 FE", "06 RE", and "07 DI" is set. As described above, if the stop designated time of the preceding operation has become 0 before feed is complete when reading one original, no stop operation begins. When reading one original, therefore, the operator need not wait in stop until the operation is complete, so the operability improves.

"08 FE" to "12 DI" shown in FIG. 4 indicate an operation of reading two originals by using the automatic original feeder when the scanner function is selected. Since the motor temperature has become equal to or lower than TH_C during an idling state from the preceding operation to the start of "08 FE", the suppression unnecessary state begins and continues from "08 FE" to "12 DI".

In this suppression unnecessary state, a temperature rise of the motor 216 need not be stopped, so the stop designated time is cleared to 0. "08 FE" to "12 DI" are the same as "01 FE" to "05 DI" shown in FIG. 3.

Figure 5:
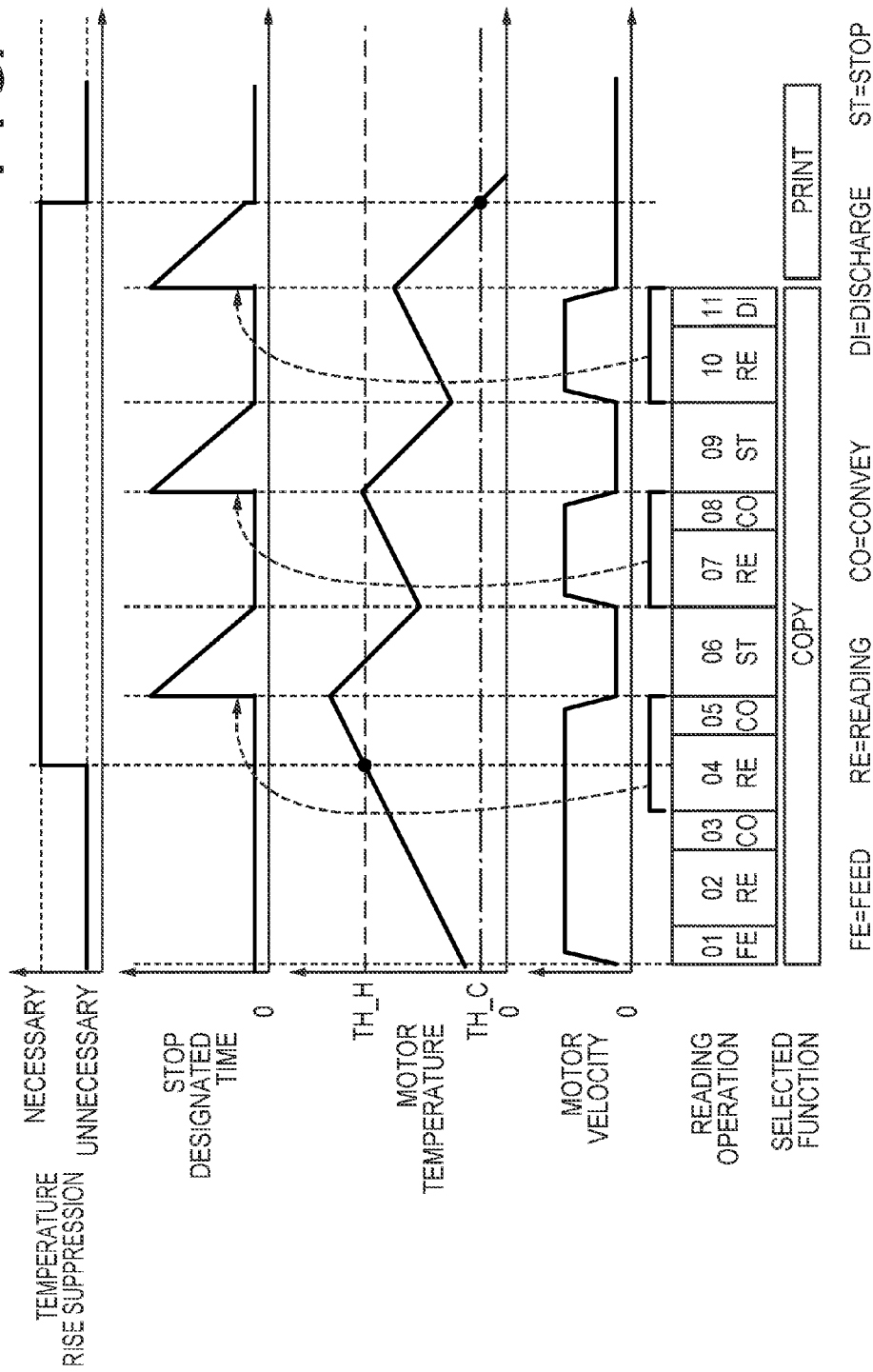
FIG. 5 is a view for explaining temperature management.

FIG. 5 shows an operation of reading a plurality of originals by using the automatic original feeder when the copy function is selected.

"01 FE" to "11 DI" shown in FIG. 5 indicate an operation of reading four originals. In this operation, the suppression unnecessary state is set from "01 FE" to the middle of "04 RE", and the suppression necessary state is set from the middle of "04 RE" to "11 DI". A series of operations from "01 FE" to "11 DI" are the same as those explained with reference to FIGS. 3 and 4, so a repetitive explanation will be omitted.

After the reading operation from "01 FE" to "11 DI", the read image is printed (in "PRINT"). Temperature management in this process will be explained below. The printing function is an operation using the image forming unit 9 of the multi function peripheral 1, so the automatic original feeder is not used. During the printing function, therefore, the motor 216 is stopped, so the motor temperature lowers with the elapse of time. Accordingly, during the printing function, the stop designated time is reduced with the elapse of time in the same manner as in the idling state. Thus, a function not using the automatic original feeder is operated regardless of the stop designated time and suppression necessary state.

Figure 6:
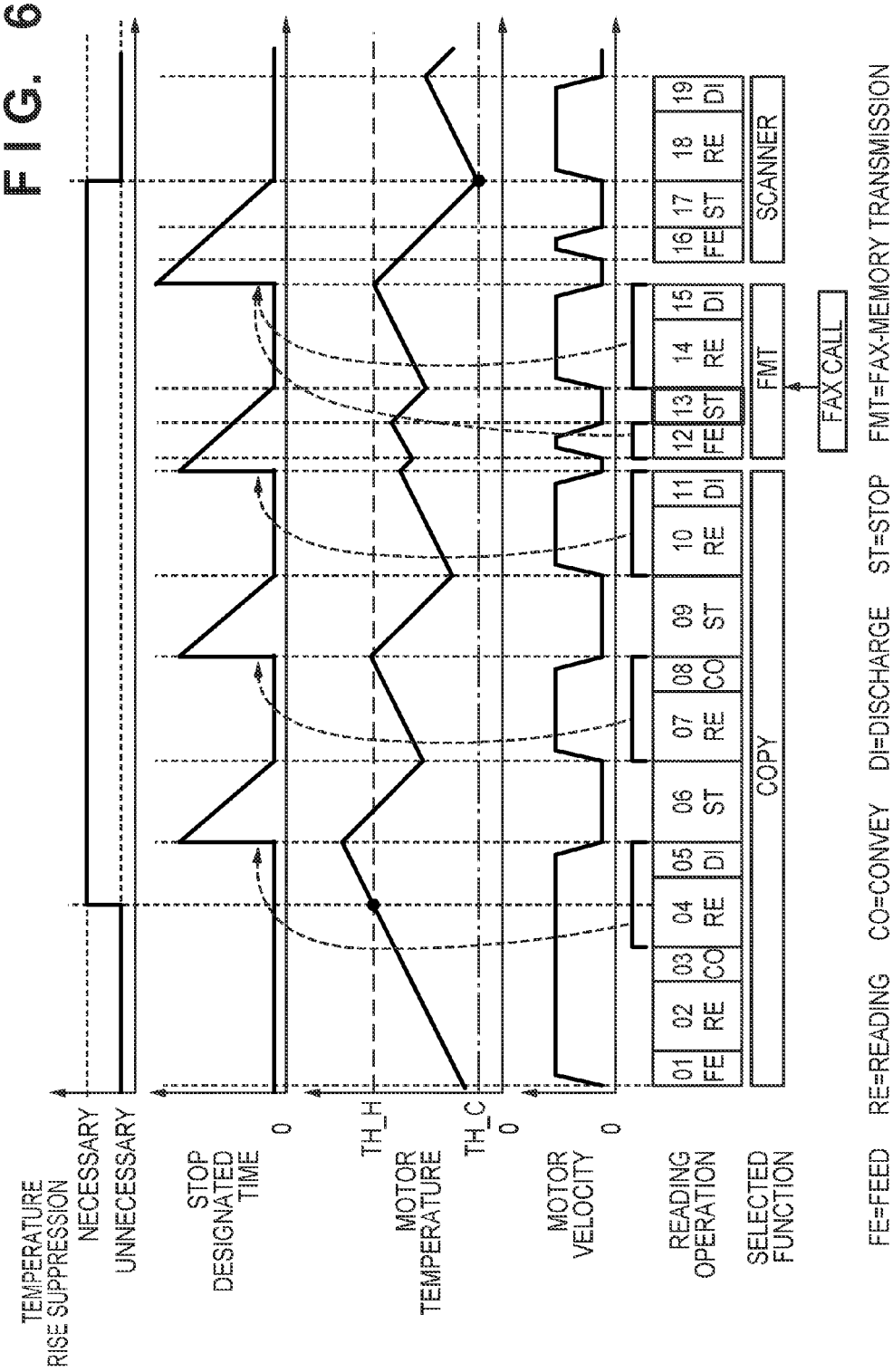
FIG. 6 is a view for explaining temperature management.

FIG. 6 shows an original reading operation using the automatic original feeder when the fax-memory-transmission (FMT) function is selected after the copy function is selected, and when the scanner function is selected after that.

"01 FE" to "11 DI" indicate an operation of reading four originals by using the automatic original feeder when the copy function is selected. In this operation, the suppression unnecessary state is set from "01 FE" to the middle of "04 RE", and the suppression necessary state is set from the middle of "04 RE" to "11 DI". A series of operations from "01 FE" to "11 DI" are the same as those explained with reference to FIGS. 3 and 4, so a repetitive explanation will be omitted.

"12 FE" to "15 DI" indicate an operation of reading one original by using the automatic original feeder when the fax-memory-transmission function is selected. A series of operations will be explained.

First, an original is fed in "12 FE". After this feed is complete, "13 ST" is performed because the stop designated time set for the last original remains. In "13 ST", the motor temperature raised by reading 10 and "11 DI" for the fourth original when the copy function is selected is decreased. In fax-memory transmission, the transmission destination is called after image data is recorded in a memory. Therefore, no call is placed during "13 ST".

When "13 ST" is complete, "14 RE" for the first fed original is performed. At the timing at which a process of storing the read image data as code data as a fax-transmission target into the RAM is started, a line is connected by calling the transmission destination, and a process of transmitting the code data is started. When "14 RE" is complete, "15 DI" is performed because there is no next original. When "15 DI" is complete, the stop designated time is set because the current state is the suppression necessary state. Since "12 FE" is the operation in the suppression necessary state, a stop designated time corresponding to the driving amount and driving velocity of the motor 216 in "12 FE", "14 RE", and "15 DI" is set.

"16 FE" to "19 DI" indicate an operation of reading one original by using the automatic original feeder when the scanner function is selected. In this operation, the suppression necessary state is set from "16 FE" to "17 ST", and the suppression unnecessary state is set from "18 RE" to "19 DI". A series of operations are the same as those explained with reference to FIGS. 3 and 4, so a repetitive explanation will be omitted.

Figure 7:
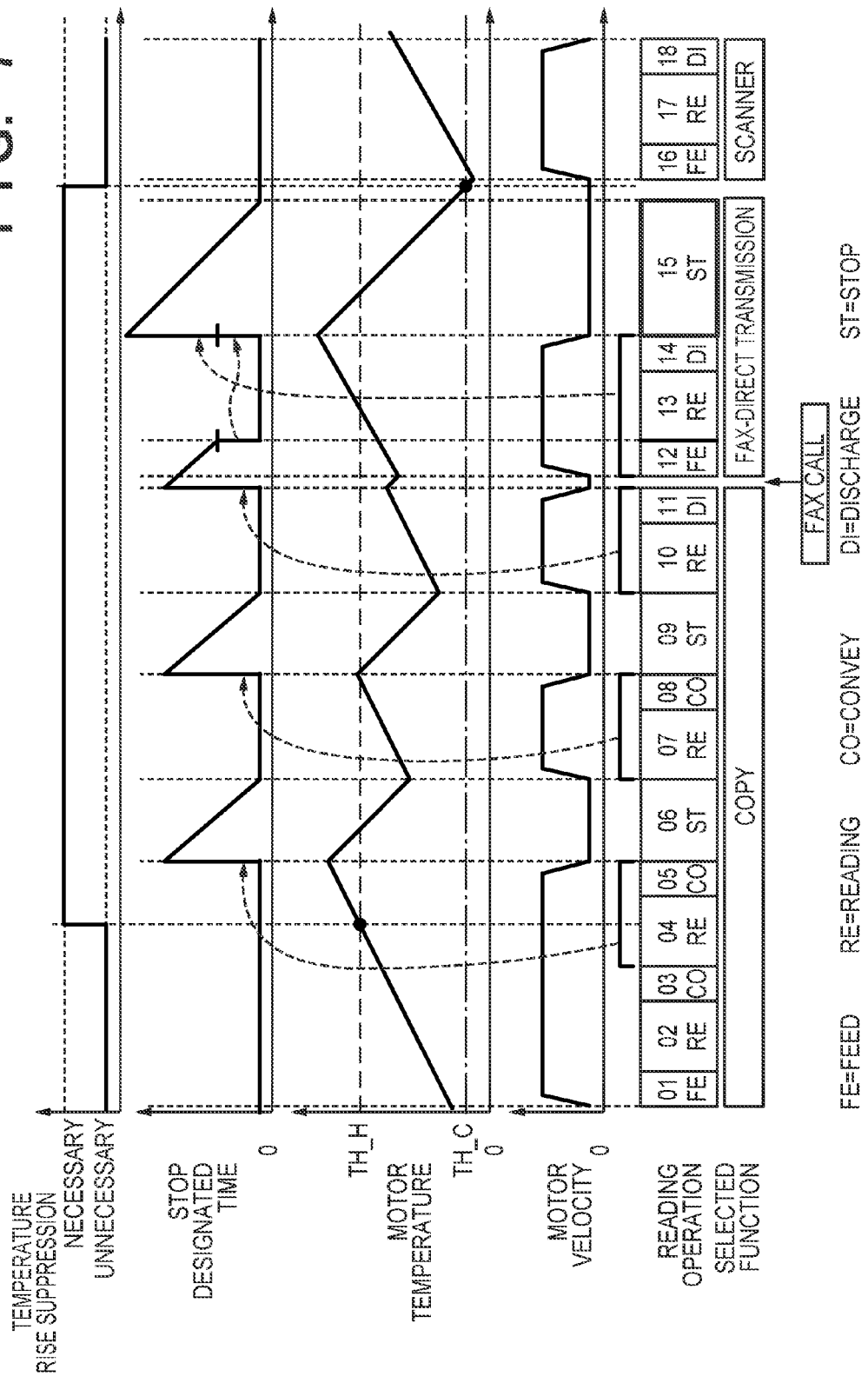
FIG. 7 is a view for explaining temperature management.

FIG. 7 shows an original reading operation using the automatic original feeder when the fax-direct-transmission function is selected after the copy function is selected, and the scanner function is selected after that.

In fax-direct transmission, transmission of image data to the connection destination is started by a reading start operation by the operator. Since this operation follows the transmission protocol of the communication standards, transmission of the image data must be started within a predetermined time after the start operation. If it is impossible to start reading and transmit image data, the communication standards cannot be satisfied, so a communication error occurs, and the line is disconnected.

When the fax-direction-transmission function is selected, therefore, even if the stop designated time remains before "reading" in the suppression necessary state, control is so performed as to start reading and start transmission of the image data.

"01 FE" to "11 DI" indicate an operation of reading four originals by using the automatic original feeder when the copy function is selected. In this operation, the suppression unnecessary state is set from "01 FE" to the middle of "04 RE", and the suppression necessary state is set from the middle of "04 RE" to "11 DI". A series of operation from "01 FE" to "11 DI" are the same as those explained with reference to FIGS. 3 and 4, so a repetitive explanation will be omitted.

"12 FE" to "14 DI" indicate an operation of reading one original by using the automatic original feeder when the fax-direct-transmission function is selected. A series of operations will be explained.

Before "12 FE", the operator connects the line by placing a call. That is, in the fax-direct-transmission function, a call is placed without waiting for the start of recording of image data into the memory. Then, the operator starts the reading operation by pressing a start key of the operation unit 5 of the multi function peripheral 1. When the reading operation is started, "12 FE" is first performed. In this stage, the stop designated time is not 0 in the suppression necessary state, but "13 RE" is performed without stopping a temperature rise. The read image data is transmitted to the transmission destination to which the line is connected. A temperature rise of the motor 216 caused by "12 FE" will be suppressed later (by the setting of the stop designated time for this original), and the stop designated time set for the last original is reduced. The stop designated time remaining at the start of reading is added to the stop designated time in "15 ST" after discharge (to be described later).

When "13 RE" is complete, "14 DI" is performed because there is no next original. When "14 DI" is complete, the stop designated time is set because the current state is the suppression necessary state.

Since "12 FE" is the operation in the suppression necessary state, a stop designated time corresponding to the driving amount and driving velocity of the motor 216 in "12 FE", "13 RE", and "14 DI" is set as the stop designated time. In addition, in order to stop the stop designated time which is not stopped before "13 RE" as described above, the unstopped stop designated time (the remaining stop designated time at the time of completion of "12 FE") is added to the stop designated time. After that, "15 ST" is performed.

Unlike a case in which other functions are selected, "15 ST" is forced driving stop, so no next function selection is received. That is, if temperature rise suppression is necessary when discharge of the fax-direct-transmission function is complete, no next function selection is received until the stop time elapses. "15 ST" is completed although original reading is complete for the following reason. That is, if the fax-direct-transmission function is selected in succession, the motor temperature sometimes keeps rising because no temperature rise stop is performed before "reading".

By thus performing no stop before the start of reading and performing stop after discharge even in the suppression necessary state, the fax-direct-transmission function can be performed even in the suppression necessary state. Also, the motor temperature can be held equal to or lower than a predetermined temperature even when the fax-direct-transmission function is successively selected.

By thus controlling stop of the motor 216 in accordance with the type of selected function, temperature rise suppression of a driving element can be performed while smoothly executing a function of processing read data. Note that when the selected function is a function which does not use the motor 216, each operation of the function can be executed without being stopped.

Also, the case in which one original is read and fax-direct transmission is performed has been explained in the example shown in FIG. 7. However, it is of course also possible to read a plurality of originals and perform fax-direct transmission. In this case, the motor temperature sometimes keeps rising if no temperature rise stop is performed before "reading" or after "convey".

In the operation of the fax-direct-transmission function, therefore, whenever a predetermined amount of image data is transmitted, image data transmission is stopped for a predetermined time, and this predetermined time is set within the range of the communication standards. The predetermined time is a time during which temperature rise stop can be performed without any trouble. By thus intermittently transmitting read image data, communication is performed at a predetermined interval, so no communication error occurs, and temperature rise stop can be performed before each "reading" of the second and subsequent originals.

FIG. 8 is a view for explaining the operation of temperature management in the error discharge processing of the automatic original feeder.

"01 FE" to "05 CO" indicate an operation of reading a plurality of originals by using the automatic original feeder when the scanner function is selected. The suppression unnecessary state is set from "01 FE" to the middle of "04 RE", and the suppression necessary state is set from the middle of "04 RE" to "05 CO". Assume that in "05 CO" as an operation of conveying the third original to the reading start position after reading of the second original is complete, the original jams (an original jam error occurs) in the automatic original feeder.

If an original jam error occurs, the stop designated time is set because the current state is the suppression necessary state. Although "04 RE" is the operation in the suppression necessary state, a stop designated time corresponding to the driving amount and driving velocity of the motor 216 in "03 CO", "04 RE", and "05 CO" is set to leave some leeway. Note that it is also possible to set a stop designated time corresponding to the driving amount and driving velocity of the motor 216 in "04 RE" and "05 CO".

If an original jam error occurs, the scan function is terminated by error termination. When the operator releases the original jam, the error discharge processing of discharging an original remaining in the original stacker 201 is performed. The error discharge processing is a process of repeating a discharge operation, and temperature rise stop of the motor 216 is performed as needed. The suppression necessary state is set from "06 ST" to the end of "10 ST", the suppression unnecessary state is set from "11 DI" to the middle of "13 DI", and the suppression necessary state is set from the middle of "13 DI" to the end of "14 ST" again.

A series of operations will be explained. "06 ST" is temperature rise stop to be performed because the stop designated time set by the operation before the error remains. Then, "07 DI" is performed. In "07 DI", an operation of discharging an original remaining in the conveyance path or original stacker 201 is performed. When "07 DI" is complete, the stop designated time is set because the current state is the suppression necessary state. As this stop designated time, a stop designated time corresponding to the driving amount and driving velocity corresponding to the motor 216 in "07 DI" is set. After that, "08 ST" is performed. "09 DI" and "10 ST" are the same as "07 DI" and "08 ST", so a repetitive explanation will be omitted.

In processing of "10 ST", the motor temperature becomes equal to or lower than TH_C, so the suppression unnecessary state is set, and three originals are successively discharged in "11 DI", "12 DI", and "13 DI". "14 ST" is performed because the suppression necessary state is set in the middle of "13 DI". The stop designated time and stop operation are the same as those of "08 ST". In this case, the suppression unnecessary state is set in "11 DI" and "12 DI", and the suppression necessary state begins in "13 DI", so a stop designated time corresponding to the driving amount and driving velocity of the motor 216 in "13 DI" is set as the stop time.

Since "14 ST" is forced driving stop, no next function selection is received. That is, if temperature rise suppression is necessary when original jam error discharge is complete, no next function selection is received until the stop time elapses. "14 ST" is completed without terminating the error discharge processing even when there is no remaining original, in order to suppress a temperature rise of the motor 216 if the fax-direct-transmission function is selected and an original jam error occurs in succession.

FIG. 9 shows an operation of reading a plurality of originals by using the automatic original feeder when the scanner function is selected. Referring to FIG. 9, it is assumed that an original is read while being conveyed at a velocity as low as possible.

"01 FE" to "06 DI" indicate an operation of reading two originals at a low velocity by using the automatic original feeder. When reading an original at a high resolution, the original conveyance velocity is decreased, so the reading time prolongs. In this operation, the suppression unnecessary state is set from "01 FE" to the middle of "03 CO", and the suppression necessary state is set from the middle of "03 CO" to "06 DI".

A series of operations will be explained. First, an original is fed in "01 FE", and the first fed original is read in "02 RE". When "02 RE" is complete, the read original is discharged and the next original is fed in "03 CO". Temperature rise stop is performed because the suppression necessary state begins in the middle of "03 CO". A stop designated time corresponding to the driving amount and driving velocity of the motor 216 in "02 RE" and "03 CO" is set to leave some leeway. When "04 ST" is complete, the second original is read in "05 RE".

When "05 RE" is complete, there is no next original, so "06 DI" is performed. When "06 DI" is complete, the stop designated time is set because the current state is the suppression necessary state. A stop designated time corresponding to the driving amount and driving velocity of the motor 216 in "05 RE" and "06 DI" is set. No forced driving stop is performed. After the stop designated time is set, the reading operation is terminated.

Figure 10A:
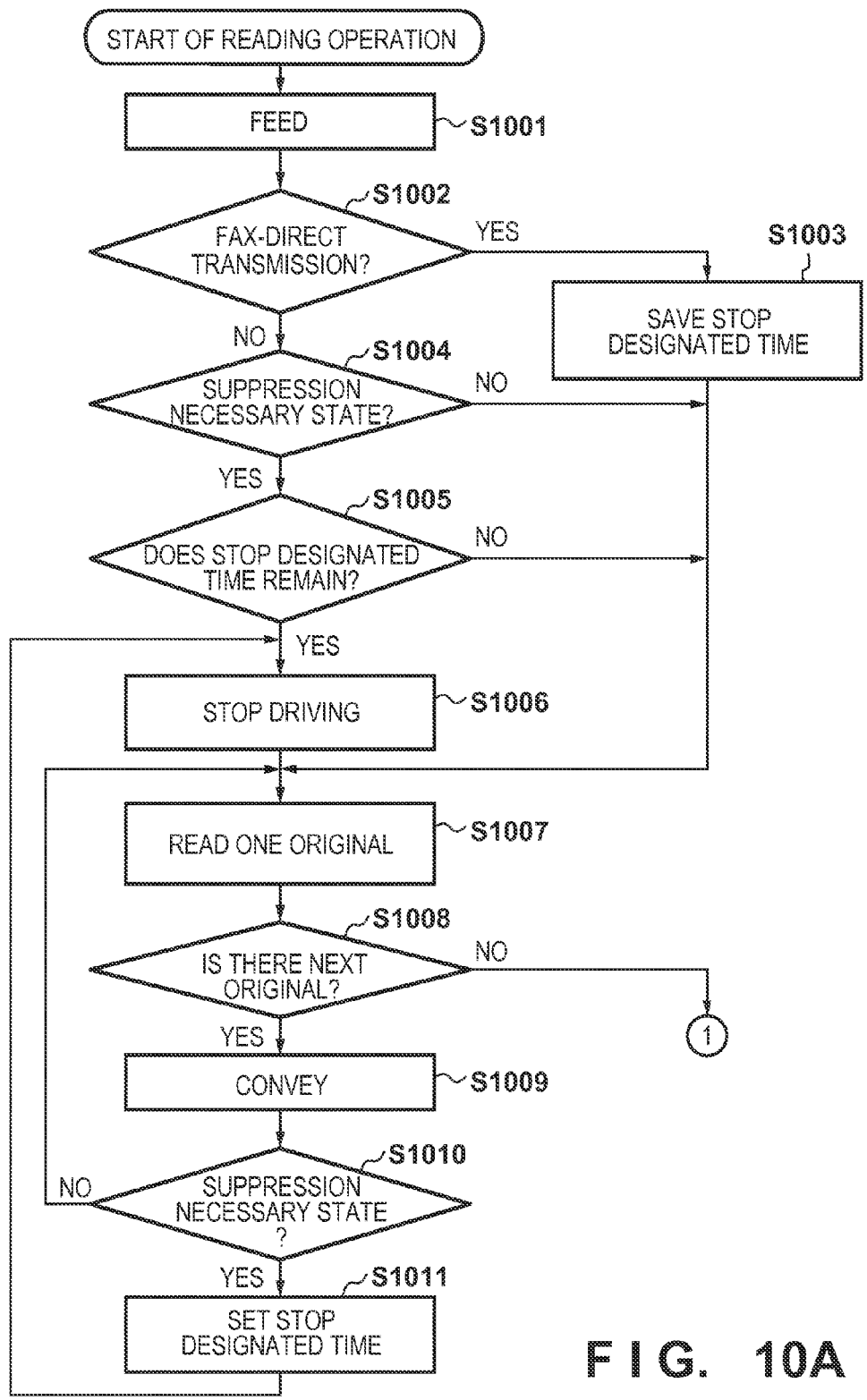

Next, as for original conveyance control of the automatic original feeder, a process example in which the CPU 10 loads a program stored in the ROM 11 into the RAM 12 and executes the loaded program will be explained. FIGS. 10A and 10B are flowcharts of the processing. This process is a process pertaining to the reading operations explained with reference to FIGS. 3 to 7 and 9, and includes temperature rise stop control of the motor 216. Note that the necessity of temperature rise suppression can be determined by another process to be executed in parallel, and the determination result can be saved in the RAM 12 and updated.

Step S1001 is a process of feeding an original from the original stacker 201. In step S1002, the type of function selected by the operator is determined. In this embodiment, whether the fax-direct-transmission function or another function is selected is determined. If the fax-direct-transmission function is selected, the process advances to step S1003. If a function (the scanner function, copy function, or fax-memory-transmission function) other than the fax-direct-transmission function is selected, the process advances to step S1004.

In step S1003, the stop designated time is saved. When the fax-direct-transmission function is selected, reading is started without performing any temperature rise stop before the start of reading, so the process advances to step S1007.

Step S1004 is a process of determining whether the motor 216 is in the suppression necessary state. If the motor 216 is in the suppression necessary state, step S1005 is performed. If the motor 216 is not in the suppression necessary state, step S1007 is performed.

Step S1005 is a process of checking whether the stop designated time remains. If the stop designated time remains, step S1006 is performed. If no stop designated time remains even though the suppression necessary state is set, the motor is not stopped, so step S1007 is performed.

In step S1006, driving of the motor 216 is stopped. This is a temperature rise stop operation for decreasing the motor temperature. When a function other than the fax-direct-transmission function is selected, control is thus performed such that temperature rise stop is possible before "reading". This temperature rise stop continues until the stop designated time becomes 0 or the suppression unnecessary state begins.

Step S1007 is a process of reading one original. An original conveyed to the reading start position is read while being moved, thereby reading the original to the trailing edge or reading a designated range.

In step S1008, whether there is a next original is determined. If there is a next original, step S1009 is performed to read the next original. If there is no next original, step S1012 is performed to terminate the reading operation.

Step S1009 is a conveying process of discharging the read original, and feeding the next original to the reading state position in order to start reading the next original.

Step S1010 is a process of determining whether the motor 216 is in the suppression necessary state. If the motor 216 is in the suppression necessary state, step S1011 is performed. If the motor 216 is not in the suppression necessary state, step S1007 is performed.

Step S1011 is a process of setting the stop designated time of temperature rise stop between original reading operations. A stop designated time corresponding to the driving amount and driving velocity of the motor 216 in the process of reading one original in step S1007 and in the conveyance process in step S1009 is set. Subsequently, in step S1006, temperature rise stop is performed in accordance with the set stop designated time.

Step S1012 is a discharge process of conveying the original read in step S1007 to the original discharge unit 206.

Step S1013 is a process of determining whether the motor 216 is in the suppression necessary state. If the motor 216 is in the suppression necessary state, step S1014 is performed. If the motor 216 is not in the suppression necessary state, the reading operation of one unit is terminated.

Step S1014 is a process of setting the stop designated time after the termination of the reading operation, or setting the stop designated time of temperature rise stop in step S1019 (to be described later). A stop designated time corresponding to the driving amount and driving velocity of the motor 216 in the process of reading one original in step S1007 and in the discharge process in step S1012 is set.

Step S1015 is a process of determining whether the suppression necessary state is set in the feeding process in step S1001. The process advances to step S1016 if the suppression necessary state is set, and advances to step S1017 if the suppression unnecessary state is set. In step S1016, a stop designated time corresponding to the driving amount and driving velocity of the motor 216 in the feeding process in step S1001 is added to the stop designated time set in step S1014.

Step S1017 is a process of determining whether the reading operation is the fax-direct-transmission function or another function. If the reading operation is the fax-direct-transmission function, step S1018 is performed. If the reading operation is a function other than fax-direction transmission, the reading operation of one unit is terminated.

Step S1018 is a process by which if reading is started without stop even when the stop designated time remains before reading of fax-direct transmission is started, temperature rise stop corresponding to the stop designated time is performed. The stop designated time saved in step S1003 is added to the stop designated time set in step S1014 (or the stop designated time added in step S1016).

Step S1019 is a forced temperature rise stop process when the suppression necessary state is set at the end of the reading operation (after the original is discharged) in which the fax-direct-transmission function is selected. When this temperature rise stop is complete, the reading operation of one unit is terminated.

Figure 11:
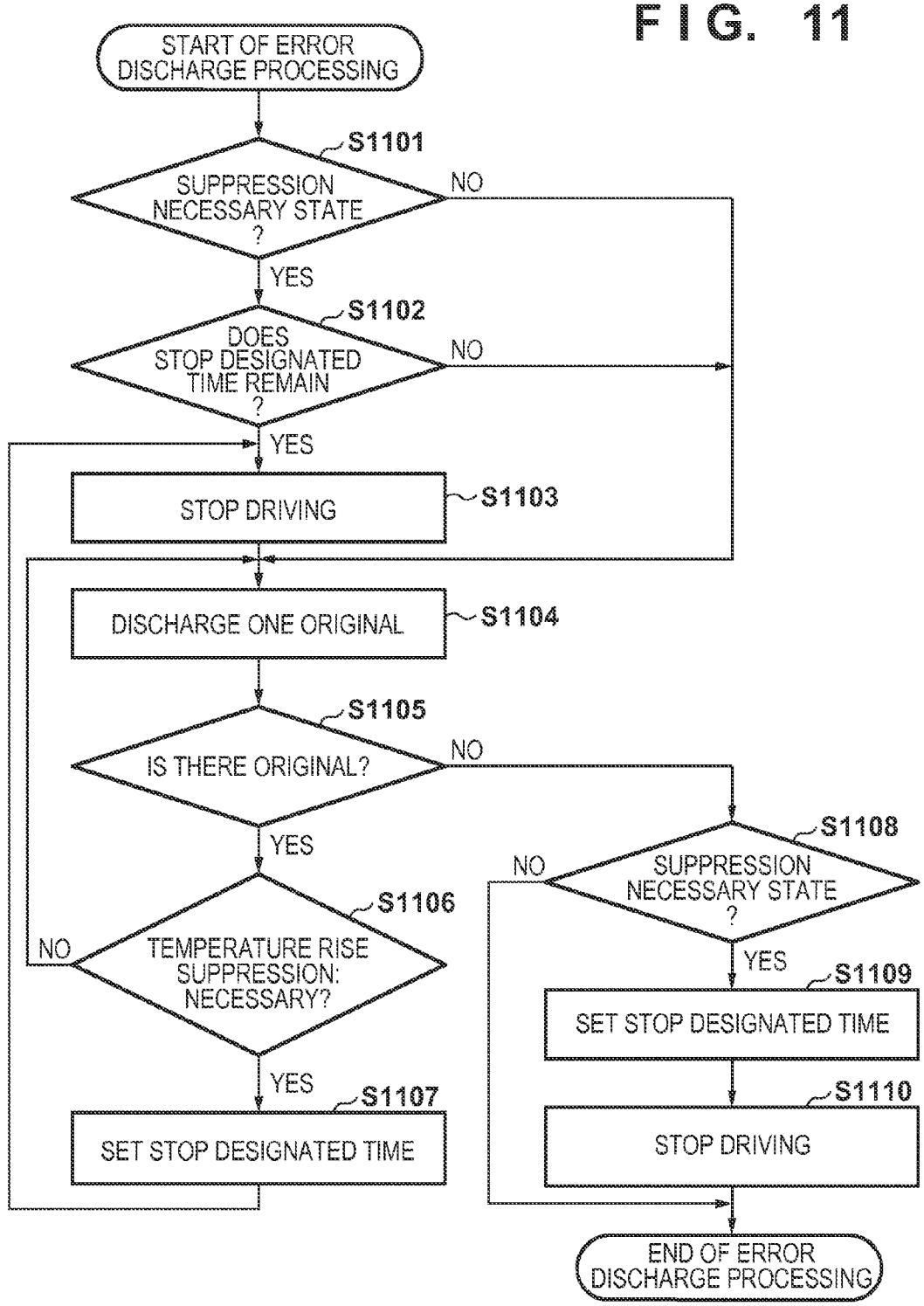
FIG. 11 is a flowchart showing an example of error discharge processing of the automatic original feeder.

As for original conveyance control of the automatic original feeder, FIG. 11 shows a process example in which the CPU 10 loads a program stored in the ROM 11 into the RAM 12 and executes the loaded program. That is, FIG. 11 is a flowchart showing the error discharge processing explained with reference to FIG. 8.

Step S1101 is a process of determining whether the motor 216 is in the suppression necessary state. Step S1102 is a process of checking whether the stop designated time remains. Steps S1101 and S1102 are branches for determining whether to perform temperature rise stop at the start of the error discharge processing. If the suppression necessary state is set and the stop designated time remains, step S1103 is performed. If not, step S1104 is performed.

Step S1103 is a temperature rise stop process when the stop designated time is set in the operation before the error discharge process. Step S1104 is a process of discharging an original remaining in the conveyance path or original stacker 201.

Step S1105 is a process of determining whether an original remains in the conveyance path or original stacker 201, and determining whether to continue or terminate discharge. If an original remains, step S1106 is performed. If no original remains, step S1108 is performed.

A branch in step S1106 and step S1107 indicate a stop designated time setting process for performing temperature rise stop of the operation of discharging one original. In the suppression necessary state, a stop designated time corresponding to discharge of one original is set, and step S1103 is performed. If the suppression necessary state is not set, step S1104 is performed.

A branch in step S1108 and steps S1109 and S1110 indicate a process of performing temperature rise stop of the operation of discharging the last original. In the suppression necessary state, a stop designated time corresponding to discharge of one original is set, temperature rise stop is performed in step S1110, and the error discharge processing is terminated. If the suppression necessary state is not set, the error discharge processing is terminated.

Figure 12:
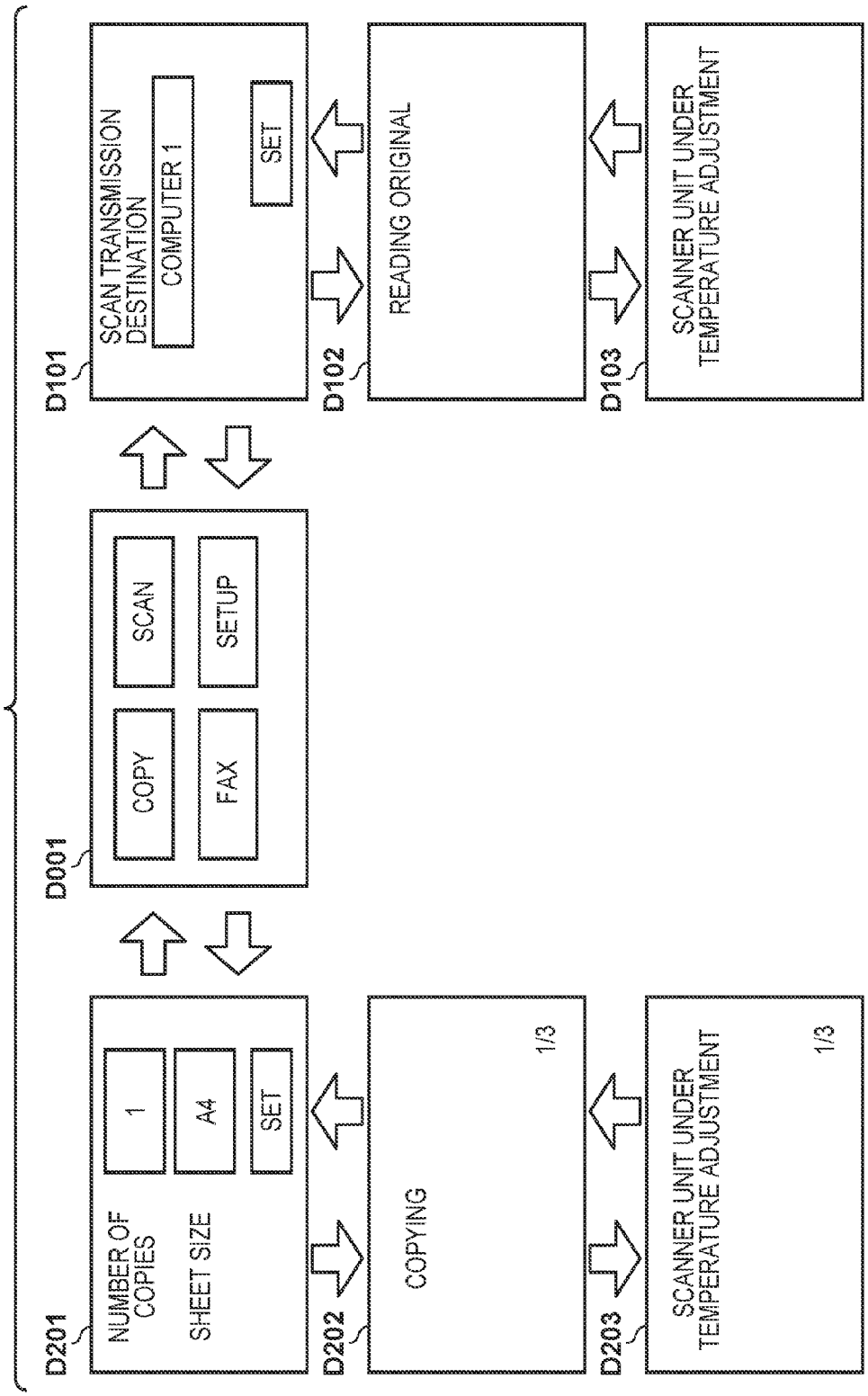
FIG. 12 is a view showing a display example of a touch panel.

Next, display examples of the touch panel of the operation unit 5 will be explained with reference to FIGS. 12 to 14. FIG. 12 is a view showing changes in display when the scanner function and copy function are selected. The operator can confirm the display contents, and can perform various kinds of selection, designation, or setting on the multi function peripheral 1 by operating the touch panel.

A screen D001 is a home screen as an initial screen of the multi function peripheral 1. On the home screen D001, the various functions of the multi function peripheral 1 can be selected. "scan", "copy", and "fax" respectively indicate the scanner function, copy function, and fax function. The "fax" includes the fax-memory-transmission function and fax-direct-transmission function.

When the scan in the screen D001 is selected, the display changes to a screen D101. When the copy is selected, the display changes to a screen D201.

The screen D101 is a scanner function screen. On the scanner function screen D101, the transmission destination of a read original and the image quality of a read image can be set. Various settings can be performed by touching a set button. In FIG. 12, "computer 1" is set as the transmission destination of an original. When the operator presses a start button (not shown) of the multi function peripheral 1, reading is started, and the display changes to a screen D102. When the operator presses a return button (not shown) of the multi function peripheral 1, the display changes to the screen D001.

The screen D102 shows that scan is in execution. The screen D102 notifies the user that the scan operation is under execution. In this embodiment, "reading original" is displayed. When scan is complete, the display changes to the screen D101. When a temperature rise of the motor 216 is stopped for temperature management of the motor 216, the display changes to, for example, a screen D103. The screen D103 notifies the user that the scan operation is being stopped. In this embodiment, "scanner unit under temperature adjustment" is displayed. When resuming the scan operation, the display changes to the screen D102.

The screen D201 is a copy function screen. On the copy function screen D201, various conditions such as the number of copies to be output and the sheet size can be set. The various conditions can be set by touching a set button. When the operator presses the start button (not shown) of the multi function peripheral 1, copying is started, and the display changes to a screen D202. When the operator presses the return button (not shown) of the multi function peripheral 1, the display changes to the screen D001.

The display D202 shows that copying is in execution. The display D202 notifies the user that the copy operation is under execution. In this embodiment, "copying" is displayed. When copying is complete, the display changes to the screen D201. When a temperature rise of the motor 216 is stopped for temperature management of the motor 216, the display changes to, for example, a screen D203. The screen D203 notifies the user that the copy operation is being stopped. In this embodiment, "scanner unit under temperature adjustment" is displayed. When resuming the copy operation, the display changes to the screen D202.

Figure 13:
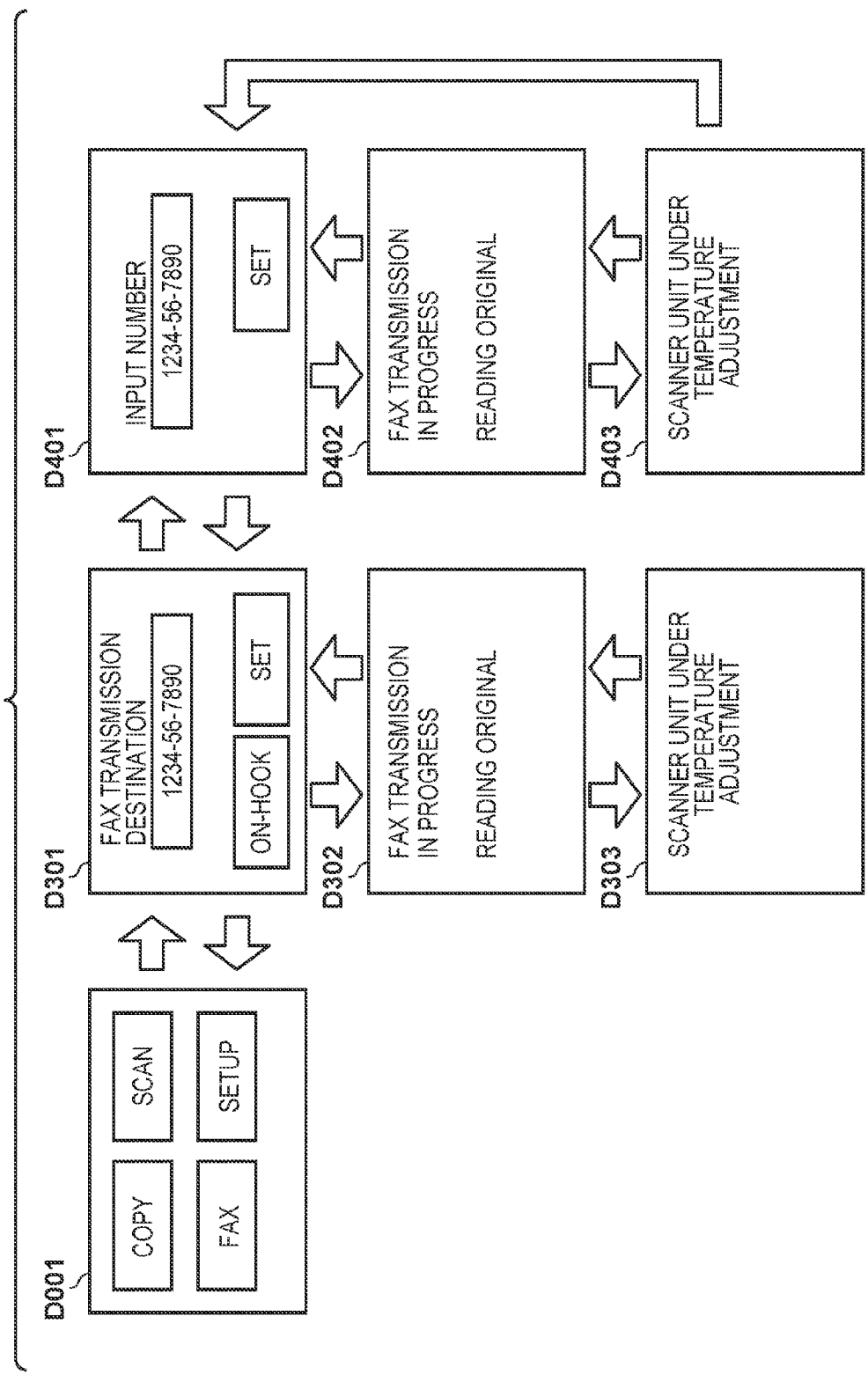
FIG. 13 is a view showing a display example of the touch panel.

FIG. 13 is a view showing changes in display when the fax function is selected. When the fax function is selected in the home screen D001, the display changes to a screen D301.

The screen D301 is a fax standby screen. On the fax standby screen D301, the transmission destination of fax-memory transmission and various conditions of fax transmission/reception can be set. The various conditions can be set by touching a set button. As described earlier with reference to FIG. 6, fax-memory transmission is the function by which after reading of an original is started by a start operation by the operator, the line is connected to the transmission destination, and the read image data is transmitted.

When the operator presses the start button (not shown) of the multi function peripheral 1, reading of an original is started, and the display changes to a screen D302. When on-hook is selected, the display changes to a screen D401. When the operator presses the return button (not shown) of the multi function peripheral 1, the display changes to the screen D001.

The screen D302 shows that a fax original is being read. The screen D302 notifies the user that a fax original reading operation is in execution. In this embodiment, "fax transmission in progress and reading original" is displayed. Reading of an original is started, the line is connected by calling the transmission destination, and the read image data is transmitted. When original reading is complete, the display changes to the screen D301. When a temperature rise of the motor 216 is stopped for temperature management of the motor 216, the display changes to, for example, a screen D303. The screen D303 notifies the user that the fax original reading operation is being stopped. In this embodiment, "scanner unit under temperature adjustment" is displayed. When resuming the operation, the display changes to the screen D302.

The screen D401 is a fax-direct-transmission/reception standby screen. As described earlier with reference to FIG. 7, fax-direct transmission is the method of connecting the line to the transmission destination before reading of an original is started, starting reading by an operation by the operator after the line is connected, and transmitting the read image data.

On the fax-direct-transmission/reception standby screen D401, the connection destination of fax-direct transmission/reception and various conditions of fax transmission/reception can be set. When the operator inputs the transmission destination, the transmission destination is called and the line is connected. When the operator presses the start button (not shown) of the multi function peripheral 1 after the line is connected, reading is started, and the display changes to a screen D402. When the operator presses the return button (not shown) of the multi function peripheral 1, the display changes to the screen D401.

The screen D402 shows that fax-direct transmission is in progress. The screen D402 notifies the user that the fax-direct-transmission operation is in execution. In this embodiment, "fax transmission in progress and reading original" is displayed. Reading of an original is started, and the read image data is transmitted to the connected transmission destination. When transmission is complete, the display changes to the screen D401. When a temperature rise of the motor 216 is stopped for temperature management of the motor 216, the display changes to, for example, a screen D403. The screen D403 notifies the user that the fax-direct-transmission operation is being stopped. In this embodiment, "scanner unit under temperature adjustment" is displayed. When resuming the operation, the display changes to the screen D402.

Figure 14:
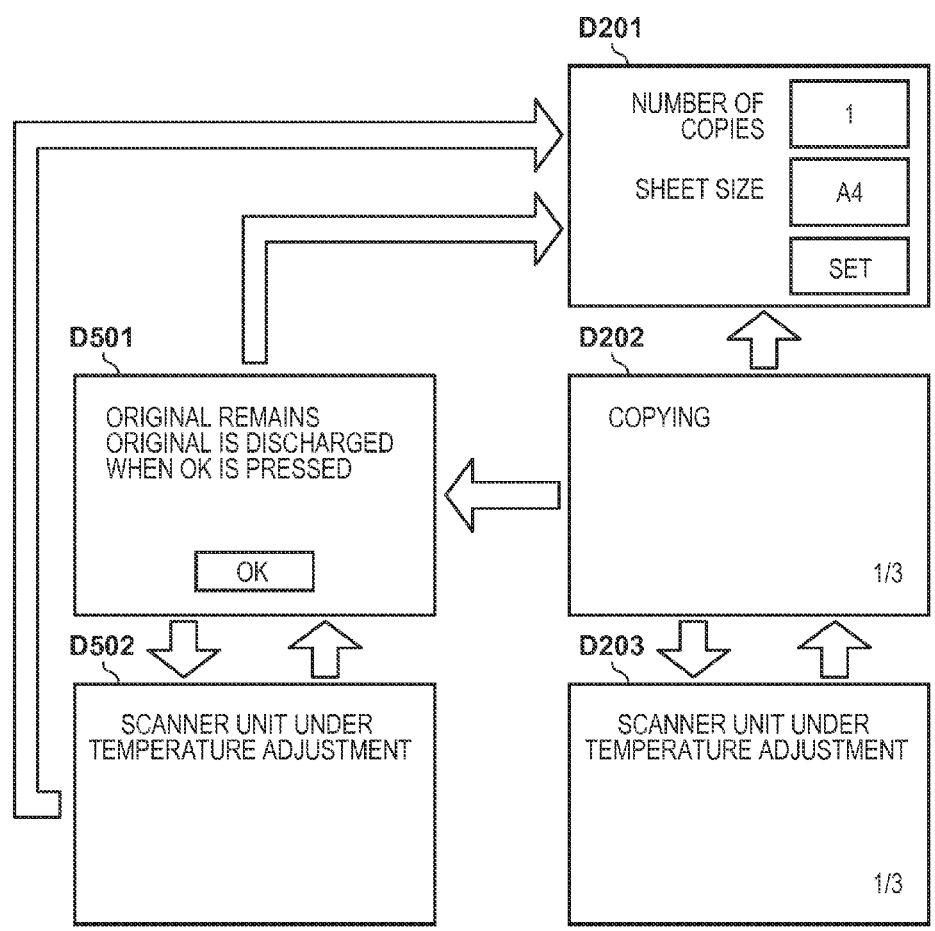
FIG. 14 is a view showing a display example of the touch panel.

FIG. 14 is a view showing changes in display in the error discharge processing. Screens D201, D202, and D203 are the same as those described above with reference to FIG. 12, so a repetitive explanation will be omitted.

When copying is in progress on the screen D202, the display changes to a screen D501 if copying is terminated by error termination due to, for example, cancellation by the operator, original jam, or an error in the image forming unit.

The screen D501 is a screen for confirming that an original remaining in the conveyance path or original stacker 201 is discharged. In this embodiment, "original remains and is discharged when ok is pressed" is displayed. When OK is selected, a discharge operation is started. If there is no more original in the conveyance path or original stacker 201, the display changes to the screen D201. When a temperature rise of the motor 216 is stopped for temperature management of the motor 216, the display changes to, for example, a screen D502. The screen D502 notifies the user that the discharge process operation is being stopped. In this embodiment, "scanner unit under temperature adjustment" is displayed. When resuming the operation, the display changes to the screen D501. If temperature rise stop of the motor 216 and original discharge are complete, the display changes to the screen D201.

In this embodiment, stop is performed between pages and is not performed midway along a page. This makes it possible to stabilize the quality of a read image. Also, even when temperature rise suppression is found to be necessary, stop is performed after feed is executed if a job is received. Accordingly, the user can easily recognize that the job is received.

Furthermore, when performing fax transmission in this embodiment, it is possible to suppress a temperature rise while satisfying temporal restrictions by the protocol. In addition, if temperature rise suppression is necessary after fax manual transmission, stop is performed without receiving any user's operation. This makes it possible to prevent the motor from exceeding an allowable temperature when the fax-direct-transmission function is selected and, for example, an original jam error occurs in succession.

This embodiment can prevent the motor from raising the temperature and exceeding an allowable temperature without using any temperature sensor near the motor.

Other Embodiments

In the above-described embodiment, the example in which temperature rise stop is performed to suppress a temperature rise of the motor 216 is explained. However, a driving element as a target of temperature rise suppression is not limited to this. For example, the motor 217, the image reading unit 7 (an image sensor), and the light source unit which irradiates an original with light can also be targets of temperature rise suppression.

In the above-described embodiment, the example in which no temperature rise stop is performed before "reading" when the fax-direct-transmission function is selected has been explained. However, the restriction on the image data transmission timing changes depending on the type of protocol of the communication standards to be used. Therefore, it is also possible, in accordance with the type of protocol, to perform temperature rise stop before the reading operation and then start "reading" within the range of restriction.

In the above-described example, the example in which the reading operation is started without performing any temperature rise stop even if the stop designated time remains when the fax-direct-transmission function is selected has been explained. However, the type of function for which this control is performed is not limited to the fax-direct-transmission function. For example, if there is a restriction on the image data transmission timing in a function of transmitting data, it is also possible to perform the same temperature rise stop control as that of the fax-direct-transmission function. In addition, temperature management methods may also be switched in accordance with a request from the transmission destination in the function of transmitting data. Furthermore, the same temperature management as that of the fax-direct-transmission function may also be performed in a function other than fax-direct transmission by setting the temperature management method on the operation unit 5 by the operator.

When executing the copy function or scanner function in the above-described embodiment, if the suppression necessary state is set, stop designation is performed after reading and conveyance are performed. However, the present invention is not limited to this. It is also possible to perform stop designation after reading, and perform stop after conveyance and reading are performed.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No 2014-170893, filed Aug. 25, 2014, which is hereby incorporated by reference herein in its entirety.

What is claimed is:

1. An apparatus comprising:
    a reception unit configured to receive selection of a function from a plurality of types of functions;
    an execution unit configured to execute the function received by said reception unit;
    a determination unit configured to determine whether temperature rise suppression of a predetermined driving element is necessary; and
    a stop control unit configured to perform stop control on said predetermined driving element in accordance with the type of the selected function, if said determination unit determines that temperature rise suppression is necessary,
    wherein if the function received by said reception unit is a function which does not use said predetermined driving element, said stop control unit causes said execution unit to execute the function, and
    if the function received by said reception unit is a function which uses said predetermined driving element, said stop control unit causes said execution unit to execute at least an initial operation of operations included in the function, even if said determination unit determines that temperature rise suppression is necessary.

2. The apparatus according to claim 1, wherein
said predetermined driving element is used to execute a function including an operation pertaining to reading of an original,
if the function received by said reception unit is a function which does not include the operation pertaining to reading of an original, said stop control unit causes said execution unit to execute the function, and
if the function to be executed by said execution unit is a function which includes the operation pertaining to reading of an original, said stop control unit causes said execution unit to execute at least a feed operation of operations included in the function, even if said determination unit determines that temperature rise suppression is necessary.

3. The apparatus according to claim 1, wherein if said determination unit determines that temperature rise suppression of said predetermined driving element is necessary, said stop control unit sets a stop time for which driving of said predetermined driving element is stopped based on a driving amount of said predetermined driving element, and, in accordance with the set stop time, suppresses execution of an operation included in the function to be executed by said execution unit.

4. The apparatus according to claim 1, wherein if said reception unit receives selection of the function including an operation pertaining to reading of an original, said execution unit executes at least feed of the operation pertaining to reading of an original.

5. The apparatus according to claim 1, wherein while a reading unit is reading an original, said stop control unit does not stop said predetermined driving element even if said determination unit determines that temperature rise suppression of said predetermined driving element is necessary.

6. An apparatus comprising:
    a reception unit configured to receive selection of a function from a plurality of types of functions;
    an execution unit configured to execute the function received by said reception unit;
    a determination unit configured to determine whether temperature rise suppression of a predetermined driving element is necessary; and
    a stop control unit configured to perform stop control on said predetermined driving element in accordance with the type of the selected function, if said determination unit determines that temperature rise suppression is necessary,
    wherein
    if a first function including an operation pertaining to reading of an original is selected from the plurality of types of functions, said stop control unit can stop driving of said predetermined driving element in a predetermined stage of the operation pertaining to reading of an original, and
    if a second function including the operation pertaining to reading of an original is selected from the plurality of types of functions, said stop control unit stops driving of said predetermined driving element at a predetermined timing after the predetermined stage.

7. The apparatus according to claim 6, wherein if the second function is selected, said stop control unit stops driving of said predetermined driving element after an original is discharged.

8. The apparatus according to claim 6, wherein if the second function is selected, said stop control unit sets a stop time by adding a first stop time when the second function is selected to a second stop time set based on a driving amount of said predetermined driving element from the predetermined stage to the predetermined timing.

9. The apparatus according to claim 6, wherein if the second function is selected, said stop control unit does not stop driving of said predetermined driving element in the predetermined stage pertaining to reading of a first sheet of an original, and can stop driving of said predetermined driving element in the predetermined state pertaining to reading of any of second sheet and subsequent sheet of the original.

10. The apparatus according to claim 1, wherein
said stop control unit sets a stop time for stopping driving of said predetermined driving element, based on a driving amount of said predetermined driving element, wherein
if a first function including an operation pertaining to reading of an original is selected from the plurality of types of functions, the reception unit receives selection of a next function from the plurality of types of functions even if the stop time set by said stop control unit has not elapsed, and
if a second function including the operation pertaining to reading of an original is selected from the plurality of types of functions, the reception unit does not receive selection of a next function from the plurality of types of functions if the stop time set by said stop control unit has not elapsed.

11. The apparatus according to claim 6, wherein
the first function is one of a scanner function, a copy function, and a fax-memory-transmission function, and
the second function is a fax-direct-transmission function.

12. An apparatus comprising:
a reception unit configured to receive selection of a function from a plurality of types of functions;
an execution unit configured to execute the function received by said reception unit;
a determination unit configured to determine whether temperature rise suppression of a predetermined driving element is necessary; and
a stop control unit configured to perform stop control on said predetermined driving element in accordance with the type of the selected function, if said determination unit determines that temperature rise suppression is necessary, wherein
if the function received by said reception unit is a fax-direct-transmission function, said stop control unit causes said execution unit to execute the fax-direct-transmission function even if said determination unit determines that temperature rise suppression is necessary.

13. The apparatus according to claim 3, wherein
if the function received by said reception unit is a fax-direct-transmission function, said stop control unit suppresses reception by said reception unit until a set stop time elapses after execution of the fax-direct-transmission function.

14. The apparatus according to claim 3, wherein
if the function received by said reception unit is a fax-direct-transmission function for a plurality of originals, said stop control unit stops transmission of image data to be executed by said execution unit whenever said execution unit transmits a predetermined amount of image data, and, after a set stop time has elapsed, causes said execution unit to transmit a predetermined amount of image data.

15. The apparatus according to claim 3, wherein
if the function received by said reception unit is one of a copy function and a scanner function for an original including a plurality of sheets, said stop control unit stops execution of an operation included in the function to be executed by said execution unit whenever said execution unit executes a reading operation and a convey operation of one sheet of the original, and, after a set stop time has elapsed, resumes the operation included in the function to be executed by said execution unit.

16. The apparatus according to claim 1, further comprising:
a reading unit configured to read an original; and
a conveying unit configured to convey an original,
wherein said reading unit reads an original conveyed by said conveying unit,
said predetermined driving element is a motor configured to form a driving source of said conveying unit, and
the plurality of types of functions include a scanner function, a copy function, a fax-memory-transmission function, and a fax-direct-transmission function.

17. A method comprising:
receiving selection of a function from a plurality of types of functions;
executing the received function;
determining whether temperature rise suppression of a predetermined driving element is necessary; and
performing stop control on the predetermined driving element in accordance with the type of the selected function, if it is determined that temperature rise suppression is necessary,
wherein if the received function is a function which does not use said predetermined driving element, the function is executed, and
if the received function is a function which uses said predetermined driving element, at least an initial operation of operations included in the function is executed, even if it is determined that temperature rise suppression is necessary.

18. A non-transitory computer-readable storage medium storing a program which causes a computer to function as:
a reception unit configured to receive selection of a function from a plurality of types of functions;
an execution unit configured to execute the function received by said reception unit;
a determination unit configured to determine whether temperature rise suppression of a predetermined driving element is necessary; and
a stop control unit configured to perform stop control on said predetermined driving element in accordance with the type of the selected function, if said determination unit determines that temperature rise suppression is necessary,
wherein if the function received by said reception unit is a function which does not use said predetermined driving element, said stop control unit causes said execution unit to execute the function, and
if the function received by said reception unit is a function which uses said predetermined driving element, said stop control unit causes said execution unit to execute at least an initial operation of operations included in the function, even if said determination unit determines that temperature rise suppression is necessary.

19. An apparatus comprising at least one processor and a storage device, the storage device storing computer readable instructions that, when executed by the at least one processor, cause the apparatus to:
receive selection of a function from a plurality of types of functions;
execute the selected function;
determine whether temperature rise suppression of a predetermined driving element is necessary; and perform stop control on the predetermined driving element, in accordance with the type of the selected function, if it is determined that temperature rise suppression is necessary, wherein if the received function is a function which does not use the predetermined driving element, the at least one processor executes the function, and if the received function is a function which uses the predetermined driving element, the at least one processor executes at least an initial operation of operations included in the function, even if it is determines that temperature rise suppression is necessary.

* * * * *